(12) United States Patent
Hubner et al.

(10) Patent No.: US 11,425,855 B2
(45) Date of Patent: Aug. 30, 2022

(54) AGRICULTURAL SEED DELIVERY SYSTEM USING TARGET LOCATION MAP

(71) Applicant: Deere & Company, Moline, IL (US)

(72) Inventors: Cary S. Hubner, Geneseo, IL (US); Jeffrey A. Nelson, Moline, IL (US)

(73) Assignee: Deere & Company, Moline, IL (US)

( * ) Notice: Subject to any disclaimer, the term of this patent is extended or adjusted under 35 U.S.C. 154(b) by 309 days.

(21) Appl. No.: 16/670,383

(22) Filed: Oct. 31, 2019

(65) Prior Publication Data

US 2021/0127559 A1  May 6, 2021

(51) Int. Cl.
*A01C 7/10* (2006.01)
*A01C 7/12* (2006.01)
*G05B 13/04* (2006.01)

(52) U.S. Cl.
CPC .............. *A01C 7/105* (2013.01); *A01C 7/128* (2013.01); *G05B 13/042* (2013.01)

(58) Field of Classification Search
CPC ......... A01C 7/105; A01C 7/128; A01C 7/102; A01C 7/10; A01C 7/08; A01C 7/00; A01C 7/127; A01C 7/12; G05B 13/042; G05B 13/04; G05B 13/02; G05B 13/00
See application file for complete search history.

(56) References Cited

U.S. PATENT DOCUMENTS

| | | | |
|---|---|---|---|
| 6,150,158 A | 11/2000 | Bhide et al. | |
| 6,365,679 B1 | 4/2002 | Landphair et al. | |
| 6,553,312 B2 | 4/2003 | Upadhyaya et al. | |
| 6,748,884 B1 | 6/2004 | Bettin et al. | |
| 6,941,225 B2 | 9/2005 | Upadhyaya et al. | |
| 7,270,065 B2 | 9/2007 | Conrad | |
| 7,370,589 B2 | 5/2008 | Wilkerson et al. | |
| 7,591,226 B2 | 9/2009 | Dix et al. | |
| 8,074,585 B2 | 12/2011 | Wilkerson et al. | |
| 8,074,586 B2 | 12/2011 | Garner et al. | |
| 8,322,293 B2 | 12/2012 | Wollenhaupt et al. | |
| 8,365,678 B2 | 2/2013 | Morbidelli | |
| 8,746,159 B2 | 6/2014 | Garner et al. | |
| 8,850,997 B2 | 10/2014 | Silbernagel et al. | |
| 9,043,951 B2 | 6/2015 | Tolstedt et al. | |

(Continued)

FOREIGN PATENT DOCUMENTS

| | | |
|---|---|---|
| AR | 112430 A1 | 10/2019 |
| EP | 2420122 A1 | 2/2012 |

(Continued)

OTHER PUBLICATIONS

Application and Drawings for U.S. Appl. No. 16/830,878, filed Mar. 26, 2020, 28 pages.

(Continued)

*Primary Examiner* — Christopher J. Novosad
(74) *Attorney, Agent, or Firm* — Christopher J. Volkmann; Kelly, Holt & Christenson, PLLC

(57) ABSTRACT

An agricultural machine includes a seeding system comprising a plurality of planting units, each planting unit configured to meter and deliver seed and a control system configured to obtain a seed planting model that identifies a plurality of seed planting locations on a worksite, identify a machine path on the worksite, identify, based on the machine path, a set of the seed planting locations for each of the planting units, and control each planting unit to deliver seeds to the set of seed planting locations identified for the planting unit.

20 Claims, 23 Drawing Sheets

(56) References Cited

U.S. PATENT DOCUMENTS

| | | |
|---|---|---|
| 9,226,442 B2 | 1/2016 | Grimm et al. |
| 9,955,625 B2 | 5/2018 | Baurer et al. |
| 10,602,656 B2 | 3/2020 | Bartelson et al. |
| 2004/0231575 A1 | 11/2004 | Wilkerson et al. |
| 2006/0011647 A1 | 1/2006 | Sauder et al. |
| 2010/0282141 A1 | 11/2010 | Wollenhaupt et al. |
| 2011/0054743 A1 | 3/2011 | Kocer et al. |
| 2013/0049198 A1 | 2/2013 | Liao et al. |
| 2014/0048002 A1 | 2/2014 | Grimm et al. |
| 2014/0182494 A1 | 7/2014 | Friestad et al. |
| 2014/0230705 A1 | 8/2014 | Radtke et al. |
| 2014/0261118 A1 | 9/2014 | Mayere |
| 2014/0352586 A1 | 12/2014 | Straeter |
| 2015/0319916 A1 | 1/2015 | Garner et al. |
| 2016/0057923 A1 | 3/2016 | Sander et al. |
| 2016/0227700 A1 | 8/2016 | Wendts et al. |
| 2016/0374260 A1 | 12/2016 | Kowalchuk |
| 2017/0000022 A1 | 1/2017 | Conrad |
| 2017/0049044 A1 | 2/2017 | Stoller et al. |
| 2017/0055432 A1 | 3/2017 | Graham et al. |
| 2017/0055433 A1 | 3/2017 | Jamison |
| 2017/0251590 A1 | 9/2017 | Kolb et al. |
| 2017/0251656 A1 | 9/2017 | Kolb et al. |
| 2017/0265374 A1 | 9/2017 | Wintemute et al. |
| 2018/0092294 A1 | 4/2018 | Hubner et al. |
| 2018/0192577 A1 | 7/2018 | Smith et al. |
| 2019/0037765 A1 | 2/2019 | Bartelson et al. |
| 2019/0166754 A1 | 6/2019 | Johnson et al. |
| 2020/0000018 A1 | 1/2020 | Boetsch |
| 2020/0037519 A1 | 2/2020 | Wonderlich et al. |
| 2020/0288629 A1 | 9/2020 | Bartelson et al. |
| 2021/0059107 A1 | 3/2021 | Garner et al. |

FOREIGN PATENT DOCUMENTS

| | | |
|---|---|---|
| EP | 2747541 A1 | 7/2014 |
| EP | 2901836 A1 | 8/2015 |
| EP | 3384748 A1 | 10/2018 |
| EP | 3437450 A1 | 2/2019 |
| EP | 3785508 A1 | 3/2021 |
| WO | 2007136606 A2 | 11/2007 |
| WO | 2008155235 A1 | 12/2008 |
| WO | WO 2014018717 A1 | 1/2014 |
| WO | WO 2015048867 A1 | 4/2015 |
| WO | WO 2017112892 A1 | 6/2017 |
| WO | WO2019050944 A1 | 3/2019 |

OTHER PUBLICATIONS

Application and Drawings for U.S. Appl. No. 16/996,956, filed Aug. 19, 2020, 85 pages.

Non-Final Office Action for U.S. Appl. No. 16/830,878, dated Jul. 12, 2021, 7 pages.

Application and Drawings for U.S. Appl. No. 16/895,253, filed Jun. 8, 2020, 91 pages.

Extended European Search Report and Written Opinion issued in European Patent Application No. 20202216.6, dated Mar. 29, 2021, in 11 pages.

Extended European Search Report and Written Opinion issued in European Patent Application No. 20197797.2, dated Jan. 12, 2021, in 12 pages.

Extended European Search Report and Written Opinion issued in European Patent Application No. 20204751.0, dated Mar. 29, 2021, 9 pages.

EP Patent Application No. 18181768.5-1011 Extended European Search Report dated Dec. 13, 2018, 12 pages.

Prosecution History for U.S. Appl. No. 15/669,424 including: Non-Final Office Action dated Jul. 23, 2019, Amendment dated Jun. 26, 2019, Non-Final Office Action dated Feb. 26, 2019, and Application and Drawings filed Aug. 4, 2017, 69 pages.

Amendment filed for U.S. Appl. No. 15/669,424 dated Oct. 23, 2019, 11 pages.

Notice of Allowance for U.S. Appl. No. 15/669,424 dated Nov. 22, 2019, 5 pages.

Application and Drawings for U.S. Appl. No. 16/670,312, filed Oct. 31, 2019, 73 pages.

Notice of Allowance for U.S. Appl. No. 16/830,878 dated Oct. 28, 2021, 7 pages.

Non-Final Office Action for U.S. Appl. No. 16/670,312 dated Dec. 10, 2021, 9 pages.

Extended Search Report for European Patent Application No. 21176932.8 dated Oct. 18, 2021, 13 pages.

Notice of Allowance for U.S. Appl. No. 16/670,312, dated Apr. 14, 2022, 5 pages.

AGRICULTURAL SEED DELIVERY SYSTEM USING TARGET LOCATION MAP

FIELD OF THE DESCRIPTION

The present description generally relates to planting equipment. More specifically, but not by limitation, the present description relates to a control system configured to control an agricultural planting machine based on a target seed planting model that identifies seed planting locations.

BACKGROUND

There are a wide variety of different types of agricultural seeding or planting machines. They can include row crop planters, grain drills, air seeders or the like. These machines place seeds at a desired depth within a plurality of parallel seed trenches that are formed in the soil. Thus, these machines can carry one or more seed hoppers. The mechanisms that are used for moving the seed from the seed hopper to the ground often include a seed metering system and a seed delivery system.

The seed metering system receives the seeds in a bulk manner, and divides the seeds into smaller quantities (such as a single seed, or a small number of seeds—depending on the seed size and seed type) and delivers the metered seeds to the seed delivery system. In one example, the seed metering system uses a rotating mechanism (which is normally a disc or a concave or bowl-shaped mechanism) that has seed receiving apertures, that receive the seeds from a seed pool and move the seeds from the seed pool to the seed delivery system which delivers the seeds to the ground (or to a location below the surface of the ground, such as in a trench). The seeds can be biased into the seed apertures in the seed metering system using air pressure (such as a vacuum or a positive air pressure differential).

There are also different types of seed delivery systems that move the seed from the seed metering system to the ground. One seed delivery system is a gravity drop system that includes a seed tube that has an inlet position below the seed metering system. Metered seeds from the seed metering system are dropped into the seed tube and fall (via gravitational force) through the seed tube into the seed trench. Other types of seed delivery systems are assistive systems, in that they do not simply rely on gravity to move the seed from the metering mechanism into the ground. Instead, such systems actively capture the seeds from the seed meter and physically move the seeds from the meter to a lower opening, where they exit into the ground or trench.

In these types of planting machines, the metering system and the delivery system are both often driven by separate actuators. The actuators can be electric or other machines.

The discussion above is merely provided for general background information and is not intended to be used as an aid in determining the scope of the claimed subject matter.

SUMMARY

An agricultural machine includes a seeding system comprising a plurality of planting units, each planting unit configured to meter and deliver seed and a control system configured to obtain a seed planting model that identifies a plurality of seed planting locations on a worksite, identify a machine path on the worksite, identify, based on the machine path, a set of the seed planting locations for each of the planting units, and control each planting unit to deliver seeds to the set of seed planting locations identified for the planting unit.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description generally relates to planting equipment. An example agricultural planting machine includes a seeding system that meters seeds from a source and delivers the seeds to a furrow or trench formed in the ground. The metering system operates to control the rate at which seeds are metered into the delivery system, to achieve a desired planting rate and/or seed spacing. Seeding systems can often be subjected to a variety of conditions that introduces irregularities in the metering and/or delivery of the seed to the furrow.

For example, in operation a seed meter is designed to utilize a differential air pressure to retain a pool of seeds in a singular fashion within receiving apertures located adjacent an outer perimeter of the seed metering system. As the seed meter rotates, the individual seeds are subsequently transferred to a seed delivery system in an ordered manner. In some applications, the seed meter rotates at a rate that is proportional to ground speed, or otherwise determined, to achieve a desired spacing in the ground. Variations in air pressure and seed sizes or shapes, presence of foreign materials, or other conditions can lead to deviations in seed spacing (i.e., from a desired or optimal spacing) which can decrease yield potential as the seed will not be delivered to the furrow at the desired spacing, and will subsequently product a plant and eventually a crop. Even with high accuracy seed meters, which are sometimes cost prohibitive, such conditions result in seed deviation, and limited control of seed placement once the seed leaves the seed meter.

Figure 1:
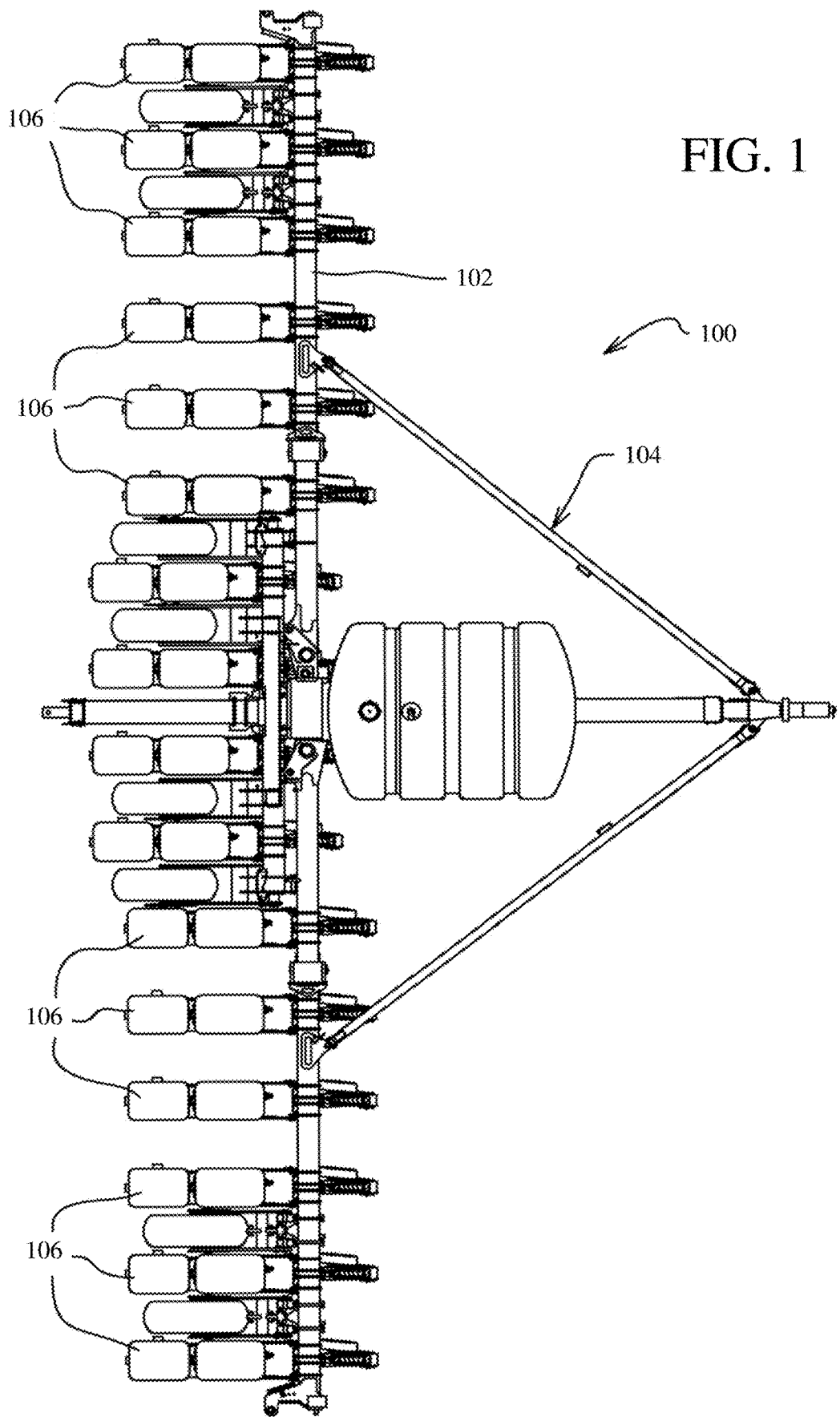
FIG. 1 shows one example of a top view of an agricultural machine.

FIG. 1 is a top view of one example of an agricultural machine 100. Agricultural machine 100 illustratively includes a toolbar 102 that is part of a frame 104. FIG. 1 also shows that a plurality of row units 106 are mounted to the toolbar. Agricultural machine 100 can be towed behind another machine, such as a tractor.

Figure 2:
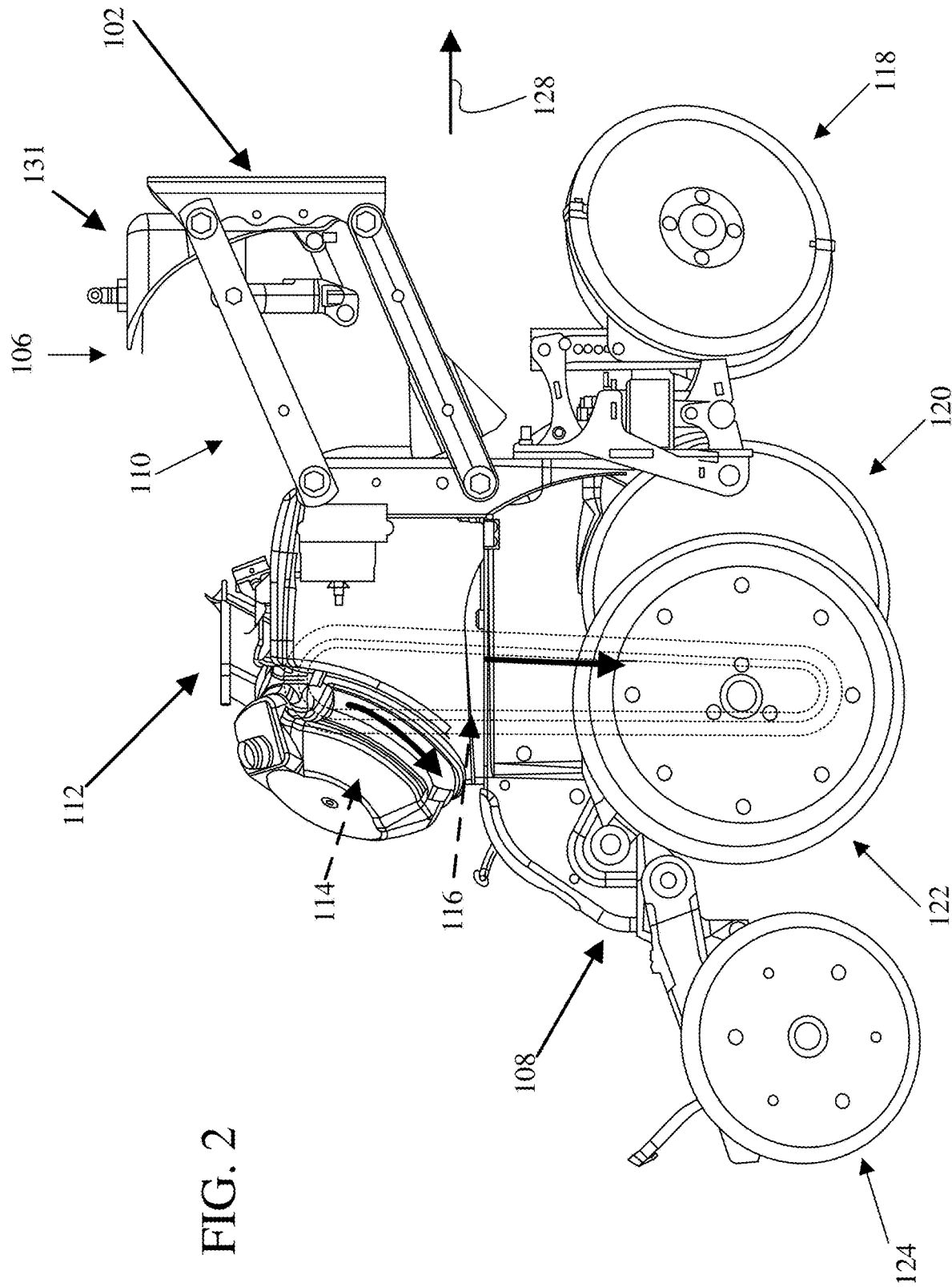
FIG. 2 shows one example of a side view of a row unit of the agricultural machine shown in FIG. 1.

FIG. 2 is a side view showing one example of a row unit 106 in more detail. FIG. 2 shows that each row unit 106 illustratively has a frame 108. Frame 108 is illustratively connected to toolbar 102 by a linkage shown generally at 110. Linkage 110 is illustratively mounted to toolbar 102 so that it can move upwardly and downwardly (relative to toolbar 102).

Row unit 106 also illustratively has a seed hopper 112 that stores seed. The seed is provided from hopper 112 to a seed metering system 114 that meters the seed and provides the metered seed to a seed delivery system 116 that delivers the seed from the seed metering system 114 to the furrow or trench generated by the row unit. In one example, seed metering system 114 uses a rotatable member, such as a disc or concave-shaped rotating member, and an air pressure differential to retain seed on the disc and move it from a seed pool of seeds (provided from hopper 112) to the seed delivery system 116. Other types of meters can be used as well.

Row unit 106 can also include a row cleaner 118, a furrow opener 120, a set of gauge wheels 122, and a set of closing wheels 124. It can also include an additional hopper that can be used to provide additional material, such as a fertilizer or another chemical.

In operation, as row unit 106 moves in the direction generally indicated by arrow 128, row cleaner 118 generally cleans the row ahead of the opener 120 to remove plant debris from the previous growing season and the opener 120 opens a furrow in the soil. Gauge wheels 122 illustratively control a depth of the furrow, and seed is metered by seed metering system 114 and delivered to the furrow by seed delivery system 116. Closing wheels 124 close the trench over the seed. A downforce generator 131 can also be provided to controllably exert downforce to keep the row unit in desired engagement with the soil.

Figure 3:
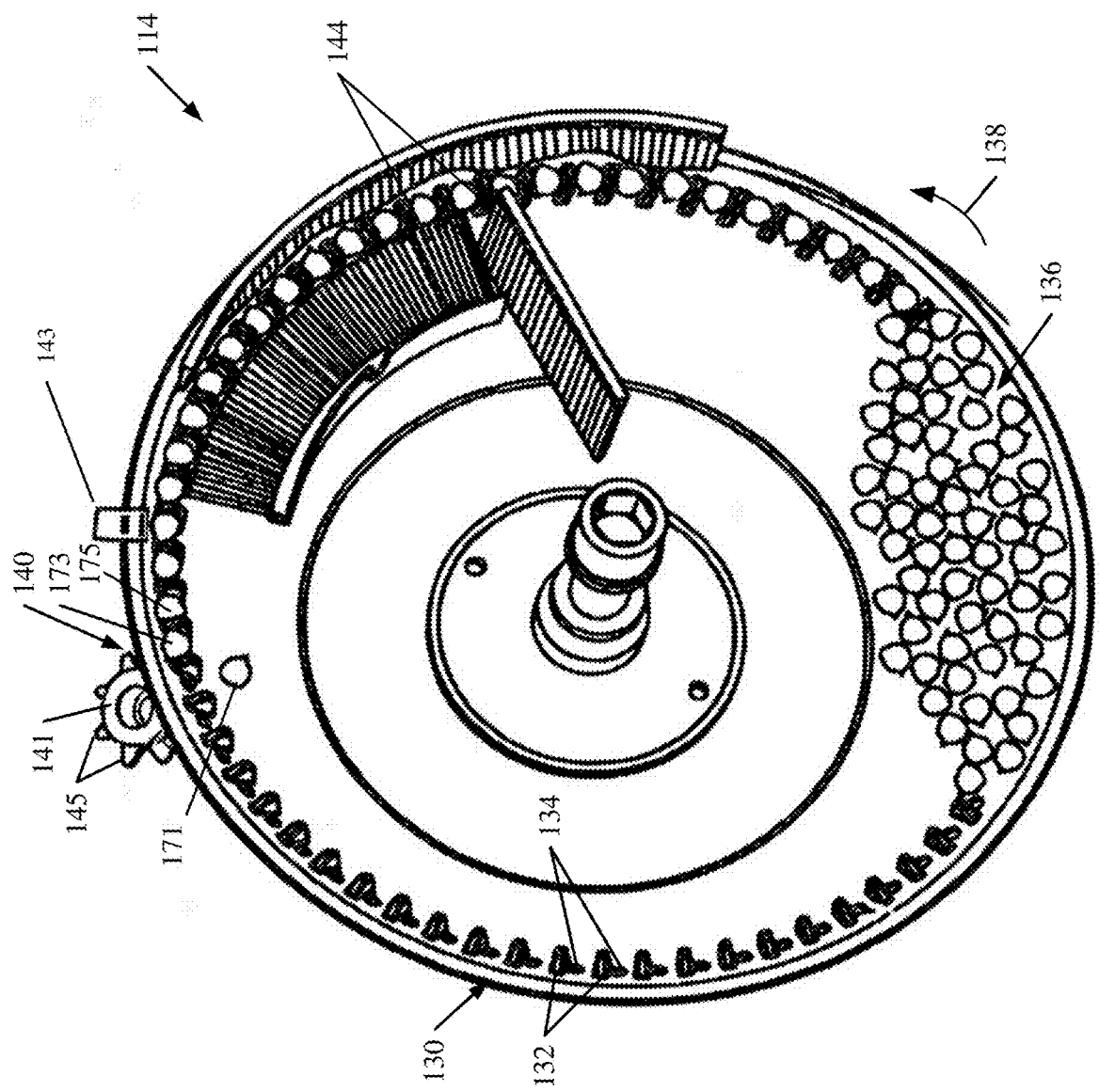
FIG. 3 is a perspective view of a portion of a seed metering system.

FIG. 3 shows one example of a rotatable mechanism 130 that can be used as part of the seed metering system. The rotatable mechanism 130 includes a rotatable disc, or concave element. Rotatable mechanism 130 has a cover (not shown) and is rotatably mounted relative to the frame 108 of the row unit 106. Rotatable mechanism 130 is driven by a motor (shown in FIG. 4) and has a plurality of projections or tabs 132 that are closely proximate corresponding apertures 134. A seed pool 136 is disposed generally in a lower portion of an enclosure formed by rotatable mechanism 130 and its corresponding cover. Mechanism 130 is rotatably driven by its machine (such as an electric motor, a pneumatic motor, a hydraulic motor, etc.) for rotation generally in the direction indicated by arrow 138, about a hub. A pressure differential is introduced into the interior of the metering mechanism so that the pressure differential influences seeds from seed pool 136 to be drawn to apertures 134. For instance, a vacuum can be applied to draw the seeds from seed pool 136 so that they come to rest in apertures 134, where the vacuum holds them in place. Alternatively, a positive pressure can be introduced into the interior of the metering mechanism to create a pressure differential across apertures 134 to perform the same function.

Once a seed comes to rest in (or proximate) an aperture 134, the vacuum or positive pressure differential acts to hold the seed within the aperture 134 such that the seed is carried upwardly generally in the direction indicated by arrow 138, from seed pool 136, to a seed discharge area 140. It may happen that multiple seeds are residing in an individual seed cell. In that case, a set of brushes or other members 144 that are located closely adjacent the rotating seed cells tend to remove the multiple seeds so that only a single seed is carried by each individual cell. Additionally, a sensor 143 is also illustratively mounted adjacent to rotatable mechanism 130 as will be discussed in FIG. 4.

Once the seeds reach the seed discharge area 140, the vacuum or other pressure differential is illustratively removed, and a positive seed removal wheel, knock-out wheel 141, can act to remove the seed from the seed cell. Wheel 141 illustratively has a set of projections 145 that protrude at least partially into apertures 134 to actively dislodge the seed from those apertures. When the seed is dislodged, it is illustratively moved by the seed delivery system 116 (two examples of which are shown below in FIGS. 3A and 3B) to the furrow in the ground.

Figure 3A:
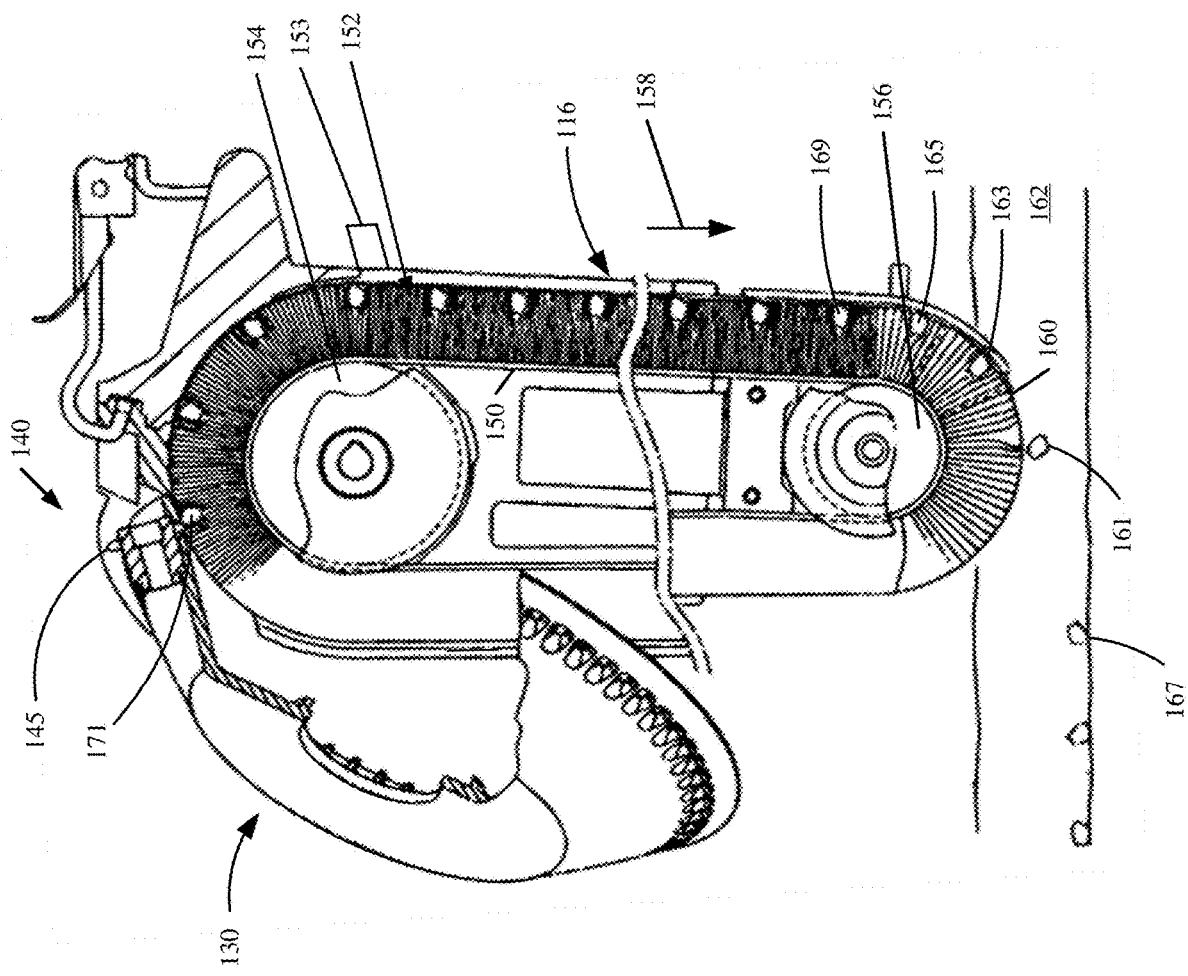
FIGS. 3A and 3B show two examples of different seed delivery systems that can be used with a seed metering system.

FIG. 3A shows an example where the rotatable mechanism 130 is positioned so that its seed discharge area 140 is above, and closely proximate, seed delivery system 116 which includes a seed transport mechanism. In the example shown in FIG. 3A, the seed transport mechanism includes a belt 150 with a brush that is formed of distally extending bristles 152 attached to belt 150. Belt 150 is mounted about pulleys 154 and 156. One of pulleys 154 and 156 is illustratively a drive pulley while the other is illustratively an idler pulley. The drive pulley is illustratively rotatably driven by a conveyance motor (such as that shown in FIG. 4) which can be an electric motor, a pneumatic motor, a hydraulic motor, etc. Belt 150 is driven generally in the direction indicated by arrow 158.

Therefore, when seeds are moved by rotatable mechanism 130 to the seed discharge area 140, where they are discharged from the seed cells in rotatable mechanism 130, they are illustratively positioned within the bristles (e.g., in a receiver) 152 by the projections 132 following each aperture that pushes the seed into the bristles. Seed delivery system 116 illustratively includes walls that form an enclosure around the bristles, so that, as the bristles move in the direction indicated by arrow 158, the seeds are carried along with them from the seed discharge area 140 of the metering mechanism, to a discharge area 160 either at ground level, or below ground level within a trench or furrow 162 that is generated by the furrow opener 120 on the row unit.

Additionally, a sensor 153 is also illustratively coupled to seed delivery system 116. As the seeds are moved within bristles 152, sensor 153 can detect the presence or absence of a seed as will be discussed below with respect to FIG. 4. It should also be noted that while the present description will proceed as having sensors 143 and 153, it is expressly contemplated that, in another example, only one sensor is used. Additional sensors can also be used.

Figure 3B:
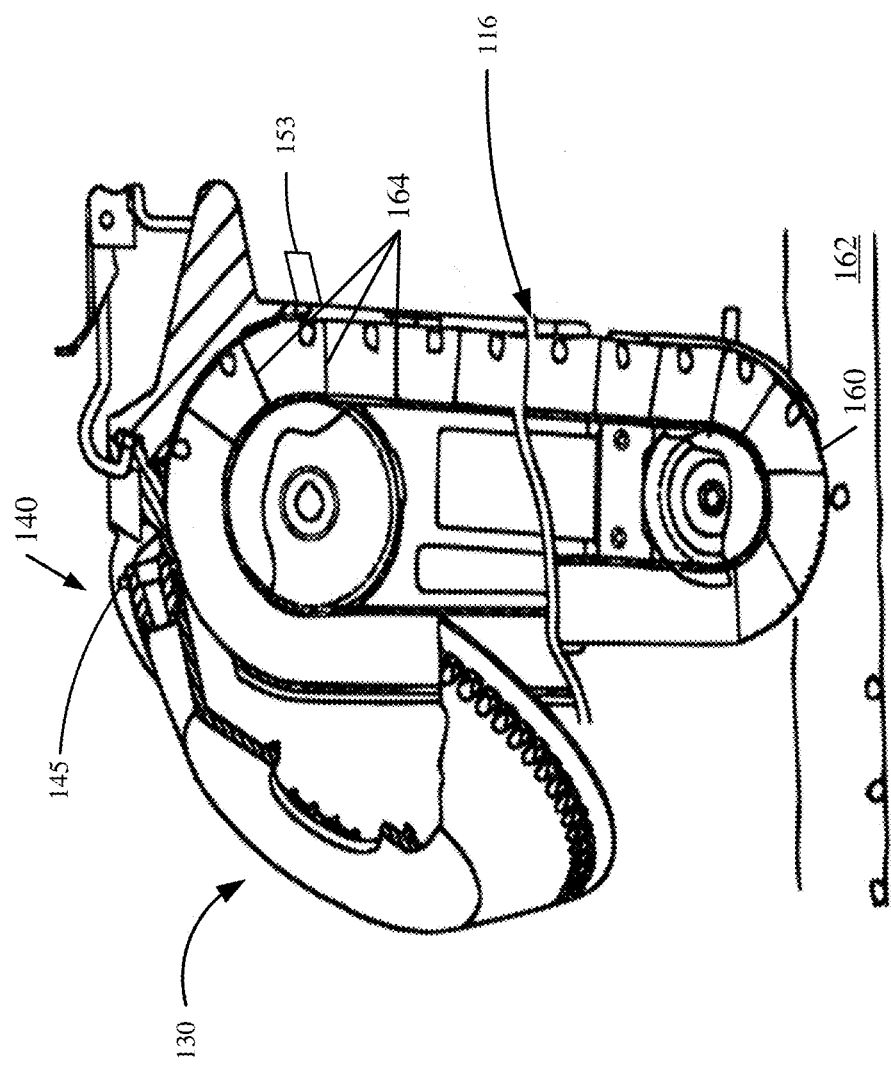

FIG. 3B is similar to FIG. 3A, except that seed delivery system 116 is not formed by a belt with distally extending bristles. Instead, the transport mechanism includes a flighted belt in which a set of paddles 164 form individual chambers (or receivers), into which the seeds are dropped, from the seed discharge area 140 of the metering mechanism. The flighted belt moves the seeds from the seed discharge area 140 to the discharge area 160 within the trench or furrow 162.

There are a wide variety of other types of delivery systems as well, that include a transport mechanism and a receiver that receives a seed. For instance, they include dual belt delivery systems in which opposing belts receive, hold and move seeds to the furrow, a rotatable wheel that has sprockets which catch seeds from the metering system and move them to the furrow, multiple transport wheels that operate to transport the seed to the furrow, an auger, among others. The present description will proceed with respect to a brush belt, but many other delivery systems are contemplated herein as well.

As mentioned above, for a variety of reasons, significant deviations in the seed placement location or spacing (from a desired or optimal location or spacing) can occur. This can adversely affect yield, decreased field area utilization, and/or results in wasted seeds. The deviations can be caused by, for example, irregularities in the operation of seed metering system 114 (e.g., irregularities in the pressure differentials), variations in seed size and/or shape, foreign material in the seed system, etc. Even if seed delivery system 116 is matched or otherwise correlated to operation of seed metering system 114, the seeds may be placed at incorrect locations and spacings.

The present description provides a processing and control system for an agricultural machine that is configured to sense and track individual seed movement through a seeding system and to control seed release to a target location.

Figure 4:
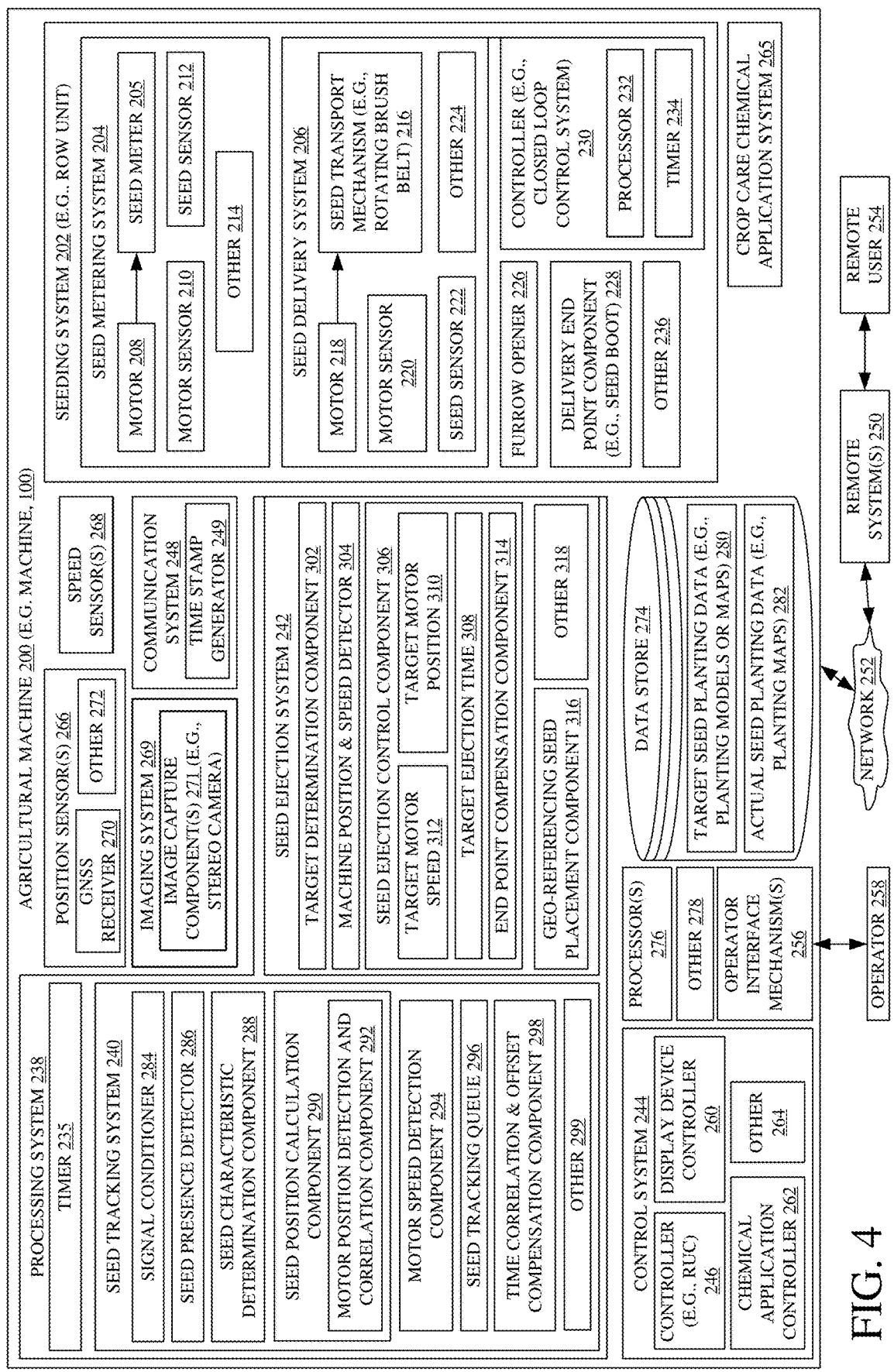
FIG. 4 is a simplified block diagram of one example of an agricultural machine architecture.

FIG. 4 shows a block diagram of one example of an agricultural machine architecture including an agricultural machine 200 having a seeding system 202. One example of machine 200 includes machine 100 illustrated above with respect to FIG. 1. In this example, each row unit includes a seeding system 202 having a seed metering system 204 and a seed delivery system 206 disposed thereon or otherwise associated with the row unit.

Seed metering system 204 includes a seed meter 205 that is driven by a motor 208 to meter or otherwise singulate seeds from a seed source (such as a seed container or tank). One example of seed meter 205 is illustrated above with respect to FIG. 3.

Seed metering system 204 can include a motor sensor 210 configured to sense characteristics of motor 208, such as a speed and/or position of motor 208 (e.g., an angular position of a motor output shaft). A seed sensor 212 can also be provided that senses the presence of seeds in seed meter 205, and can include other items 214 as well.

Seed delivery system 206 includes a seed transport mechanism 216 driven by a motor 218. Examples of seed transport mechanism 216 are illustrated above with respect to FIGS. 3A and 3B.

A motor sensor 220, which can be integrated into motor 218, or provided separately (e.g., external to motor 218), is configured to sense operational characteristics of motor 218. For example, motor sensor 220 senses an angular position of an output shaft of motor 218, that is rotatably coupled to drive seed transport mechanism 216 to transport seeds, received from seed metering system 204, to a second or release position in which the seeds are released from the seed transport mechanism 216.

It is noted that while separate motors 208 and 218 are illustrated in FIG. 4, in another example only one motor can be used to drive both seed metering system 204 and seed delivery system 206.

A seed sensor 222 is positioned along the transport route to detect the presence of seeds at the sensor location. One example of seed sensor 222 includes sensor 153 illustrated above in FIGS. 3A and 3B. Seed sensor 222 is configured to generate and send a sensor signal indicative of the sensed seed presence. As used herein, a sensor signal includes both analog signals and digital signals, such as communications using a controller area network (CAN) bus.

In addition to sending an indication (e.g., a sensor signal) indictive of the presence of a seed in the seed transport mechanism 216, seed sensor 222 (or another sensor) can be configured to sense a characteristic of the seed, such as, but not limited to, a size, shape, color or other characteristic (such as an indication that the seed is cracked or otherwise irregular). Seed delivery system 206 can include other items 224 as well.

It is noted that while FIG. 4 illustrates seed sensors 212 and 222 in each of seed metering system 204 and seed delivery system 206, in one example only seed delivery system 206 includes a seed sensor (or at least system 204 does not include a seed sensor) configured to sense the presence of seed as the seed passes the sensor location.

In one example, seed sensor 222 (and/or seed sensor 212) includes an optical or reflective sensor and thus includes a transmitter component and a receiver component. The transmitter component emits electromagnetic radiation, into seed delivery system 206 in the case of a reflective sensor. The receiver component then detects the reflected radiation and generates a signal indicative of the presence or absence of a seed adjacent to the sensor based on the reflected radiation. With other sensors, radiation such as light, is transmitted through the seed delivery system 206. When the light beam is interrupted by seed, the sensor signal varies to indicate a seed. Thus, the sensor generates a seed sensor signal that pulses or otherwise varies, and the pulses or variations are indicative of the presence of a seed passing the sensor location proximate the sensor.

In the example of a rotating brush belt, such as the example shown above with respect to FIG. 3A, bristles (e.g., bristles 152) absorb a majority of the radiation emitted from the transmitter component. As a result, absent a seed, reflected radiation received by the receiver is relatively low. Alternatively, when a seed passes the sensor location, more of the emitted light is reflected off the seed and back to the receiver component, indicating the presence of a seed. The differences in the reflected radiation allow for a determination to be made as to whether a seed is, in fact, present. Additionally, in other examples, a seed sensor can include a camera and image processing logic that provides vision detection as to whether a seed is current present within seed delivery system 206, at the sensor location proximate the sensor.

Seeding system 202 (e.g., on a particular row unit) can also include a furrow opener 226 configured to form a furrow or trench in the ground, a delivery endpoint component 228 configured to deliver the seed into the furrow, and a controller 230. In one example, controller 230 provides a closed loop control system and can include a processor 232 and a timer 234, which can be used to time the performance of operations within seeding system 202. Of course, seeding system 202 can include other items 236 as well.

Agricultural machine 200 includes a processing system 238 having a seed tracking system 240 configured to track seed movement within seeding system 202 and a seed ejection system 242 configured to control, or to generate control signals that are used by a control system 244, to control ejection of the seeds from component 228. It is noted that while processing system 238 is broken out separately in FIG. 4, some or all of the tracking and ejection control functions can be performed by seeding system 202. The illustration in FIG. 4 is for sake of example only.

Before discussing processing system 238 in further detail, other components of machine 200 will be described. In the example illustrated in FIG. 4, control system 244 is configured to control other components and systems of machine 200. For instance, control system 244 generates control signals to control communication system 248 to communicate between components of machine 200 and/or with other systems, such as remote system 250 over a network 252. Network 252 can be any of a wide variety of different types of networks, such as the Internet, a cellular network, a local area network, a near field communication network, or any of a wide variety of other networks or combinations of networks or communication systems.

In the illustrated example, a remote user 254 is shown interacting with remote system 250. Remote system 250 can be a wide variety of different types of systems. For example, remote system 250 can be a remote server environment, remote computing system that may be used, for example, by a remote user 254. Further, it can be a remote computing system, such as a mobile device, remote network, or a wide variety of other remote systems. Remote system 250 can include one or more processors or servers, a data store, and it can include other items as well.

Communication system 248 can include wireless communication logic, which can be substantially any wireless communication system that can be used by the systems and components of machine 200 to communicate information to other items, such as between seeding system 202, processing system 238, and/or control system 244. In one example, communication system 248 communicates over a CAN bus (or another network, such as an Ethernet network, etc.) to communicate information between systems 202, 238, and/or 244. This information can include the various sensor signals and output signals generated based on the sensor variables and/or sensed variables.

Processing system 238 includes one or more processors 233. In one example, processor 233 implements a timer 235 utilized in conjunction with timer 234 of seed delivery system 206, to coordinate the sending and receiving of signals and messages between processing system 238 and seeding system 202. Also, the timers 234 and 235 can be utilized for the generation and application of control signals by control system 244 to seeding system 202, to control operation of seed delivery system 206 in transporting seeds to endpoint component 228. In one example, communication system 248 includes a timestamp generator 249, which is discussed in further detail below. Briefly, however, timestamp generator 249 is configured to generate timestamps, using timers 234 and 235, on messages and signals sent by systems 206 and 238. The timestamps can be utilized by the receiving system to determine a latency in the communication channel.

Control system 244 is configured to control interfaces, such as operator interface mechanisms 256 that include input mechanisms configured to receive input from an operator 258 and output mechanisms that render outputs to operator 258. The user input mechanisms can include mechanisms such as hardware buttons, switches, joysticks, keyboards, etc., as well as virtual mechanisms or actuators such as a virtual keyboard or actuators displayed on a touch sensitive screen. The output mechanisms can include display screens, speakers, etc.

In the illustrated example, control system 244 includes a controller 246 configured to control seeding system 202 based on processing performed by processing system 238. This can include sending messages or other signals over any suitable communication mechanism, such as a CAN bus. Controller 246 can thus include a row unit controller (RUC) configured to control, either directly or with controller 230, the seeding system on each row unit. Control system 244 also is illustrated as including a display device controller 260 configured to control display device(s) that provide operator interface mechanisms 256, a chemical application controller 262, and can include other items 264 as well. Chemical application controller 262 is configured to control a crop care chemical application system 265 to control the application of chemicals, such as fertilizers, herbicides, pesticides, and the like. This is discussed in further detail below.

It is noted that in one example seeding system 202 (e.g., on a particular row unit) includes some (or all) of the components and related functionality described with respect to processing system 238. This is represented by the dashed block in FIG. 4.

Machine 200 also includes a number of other sensors including, but not limited to, position sensor(s) 266 and speed sensor(s) 268. Position sensor(s) 266 are configured to determine a geographic position, heading, and/or route of machine 200. Position sensor 266 can include, but is not limited to, a Global Navigation Satellite System (GNSS) receiver 270 that receives signals from a GNSS satellite transmitter. Position sensor 266 can also include a Real-Time Kinematic (RTK) component that is configured to enhance the precision of position data derived from the GNSS signal from receiver 270. Illustratively, an RTK component uses measurements of the phase of the signal's carrier wave in addition to the information content of the signal to provide real-time corrections, which can provide up to centimeter-level accuracy of the position determination. Position sensor(s) 266 can include other items 272 as well.

Speed sensor(s) 268 are configured to determine a speed at which machine 200 is traversing a worksite (e.g., field or other terrain) during the planting operation. This can include sensors that sense the movement of ground engaging elements (e.g., wheels or tracks) and/or can utilize signals received from other sources, such as position sensor(s) 266.

Machine 200 also includes an imaging system 269 having image capture component(s) 271 configured to capture images and image processing component(s) configured to process those images. In one example, image capture component(s) 271 includes a stereo camera configured to capture video of the worksite being operated upon by machine 200. An example stereo camera captures high definition video at thirty frames per second (FPS) with one hundred ten degree wide-angle field of view. Of course, this is for sake of example only. In one example, image capture components can include multi-spectral or hyper-spectral cameras. In any case, image capture component(s) 271 is configured to capture images of the terrain for processing by image processing component(s) 271. As discussed below, the images can be analyzed to determine planting locations, such as to avoid obstacles in the field, to conform to the field boundary, etc.

Machine 200 also includes a data store 274, one or more processors 276, and can include other items 278. Data store 274 can store any of a wide variety of different types of information. Illustratively, data store 274 stores target seed planting data (e.g., planning maps or other models) 280, actual seed planting data (e.g., planting maps) 282, and can store other data items as well.

Seed tracking system 240 illustratively includes a signal conditioner 284 configured to receive signals generated by sensor 222 (and/or sensor 212), and to condition those signals for subsequent processing. This can include amplifying the generated sensor signal, performing filtering, linearization, normalization and/or any other conditioning which can improve the quality of the sensor signal. The conditioned signal is then provided to other components of seed tracking system 240 such as, but not limited to, a seed presence detector 286, a seed characteristic determination component 288, and a seed position calculation component 290.

Seed presence detector 286 receives the sensor signal, which may be conditioned, and determines whether a seed is present in the transport route of seed transport mechanism 216, at the location corresponding to seed sensor 222. Seed presence detector 286 can distinguish between seed sensor signals which indicate background noise (indicating an absence of seed) and a pulse (indicating the presence of a seed).

Seed characteristic determination component 288 is configured to detect a characteristic of the seed. For instance, component 288 can generate an output indicative of a size, shape, color, or other characteristic of the seed. This can be utilized to determine whether the detected seed is, instead, foreign material (and thus not an actual seed), or whether the seed may have an irregularity, such as being cracked, etc., that may affect its germination and subsequent growth.

Seed position calculation component 290 is configured to calculate the position of the seed in seed transport mechanism 216, thus facilitating tracking of movement of the seed through seed delivery system 206 as seed transport mechanism 216 (e.g., brush belt) is rotated by motor 218. Component 290 includes a motor position detection and correlation component 292 configured to detect the angular position of the output shaft of motor 218, which can be coupled directly, through a transmission component, or otherwise, to seed transport mechanism 216. In either case, component 292 correlates the position of the detected seed to the angular position of the output shaft of motor 218.

A motor speed detection component 294 detects the speed of motor 218, as it rotates to move seed transport mechanism 216 and convey the seed along the transport route. Seed tracking queue 296 stores tracking information for each seed whose presence is detected by detector 286. In one example, seed tracking queue 296 stores a plurality of data records or other data items that identify each seed individually, along with information that correlates the position of the seed to the position of mechanism 216 for position tracking of the individual seed. The information in seed tracking queue 296 can be utilized to identify a number of seeds that are presently in seed transport mechanism 216, as well as the spacings between each seed and a magnitude of rotation of the output shaft of motor 218 needed to move that seed to the release point, to release the seed toward endpoint component 228.

Depending on the type of communication channel utilized by communication system 248, latencies may be introduced in the communications. For example, a typical CAN message-based communication has latency delays on the order of 5 milliseconds. A time correlation and offset compensation component 298 is configured to correlate each message or other communication sent between processing system 238 and seeding system 202 using timestamps generated by the timestamp generator 249. Component 298 is configured to account for these latencies, by compensating for timing offsets. Examples of component 298 are discussed in further detail below. Seed tracking system 240 can include other items 299.

Seed ejection system 242 includes a target determination component 302 configured to determine a target or target parameter for ejecting each seed from seed delivery system 206. The target can represent any of a variety of different types of input parameters. In the illustrated example, but not by limitation, the target is a target geographic location on the terrain (field). In one example, the target geographic location is referenced to an absolute location in the field, such as using global coordinates in a global coordinate system (e.g., World Geodetic System (WGS)). In one example, the target geographic location is referenced to local coordinates in the field.

Further, target locations for seed placement can be pre-defined (e.g., a target planting map). Alternatively, or in addition, target locations for seed placement are determined in situ or "on-the-fly". For example, image system 269 captures images that are processed to identify obstacles or other objects (e.g., field boundaries, adverse field conditions) in the field to avoid during planting. In one example, target location for placement of a next seed is determined based on a location and/or characteristic of a prior seed ejected by seeding system 202.

Machine position and speed detector 304 are configured to detect the geographic position of machine 200 using signals from position sensor(s) 266 and to determine the speed of machine 200 based on signals from speed sensor(s) 268.

Seed ejection control component 306 is configured to generate a motor operating parameter to control motor 218 to eject each seed based on the targets determined by component 302. In the illustrated example, component 306 identifies, for each individual seed in mechanism 216, a target ejection time 308 for releasing the seed from component 228, a target motor position 310 corresponding to target ejection time 308, and a target motor speed 312 corresponding to target ejection time 308.

Target ejection time 308 is determined based on the target location for the seed placement and the current machine position and machine speed. That is, the target ejection time 308 represents the time at which the next seed in mechanism 216 is to be released so that it is placed in the furrow at the target location.

In one example, determination of target ejection time 308 is compensated for a time delay between when the seed is released from seed transport mechanism 216 and the seed is deposited in the furrow by delivery endpoint component

228. Accordingly, an endpoint compensation component 314 generates an estimation of an amount of time that it will take the seed to pass from seed transport mechanism 216 (after release) through delivery endpoint component 228 and reach the furrow. This time delay can vary based on the distance to, and geometry of, component 228.

For sake of illustration, but not by limitation, assume that component 314 determines that it will take approximately one-half second for the seed to reach the furrow, once released from mechanism 216. Here, target ejection time 308 is calculated so that the seed is released approximately one-half second before component 228 (e.g., seed boot) is at the target location (taking into account the current machine position and the machine speed).

Component 306 identifies target motor position 310 for releasing the seed at the target ejection time 308. Illustratively, the target motor position 310 represents an angular rotational position of the output shaft of motor 218 at which mechanism 216 will be at a position in which the given seed will be released from mechanism 216 toward component 228. In one example, target motor position 310 is calculated based on a predefined rotational range over which the output shaft of motor 218 must rotate to move the portion of mechanism 216 containing the seed from the sensor location to the release location.

Component 306 identifies target motor speed 312 based on a desires instantaneous speed of mechanism 216 when the seed is released. This speed determines the velocity of the seed (relative to the row unit) when the seed is released. In one example, the target motor speed 312 is determined based on the machine speed. For instance, target motor speed 312 is selected so that the speed of transport mechanism 216 (and thus the speed of the seed when it is released) matches the speed of machine 200 to discourage, if not prevent, the seed from rolling in the furrow.

A geo-referencing seed placement component 316 is configured to generate a geo-referenced placement indicator that indicates the actual placement location of each seed. For example, when each seed is released from seed delivery system 206, component 316 determines the actual planting location of that seed by correlating it to GPS coordinates (or otherwise). This information can be stored as actual seed planting location data 282. Of course, system 242 can include other items 318 as well.

Figure 5:
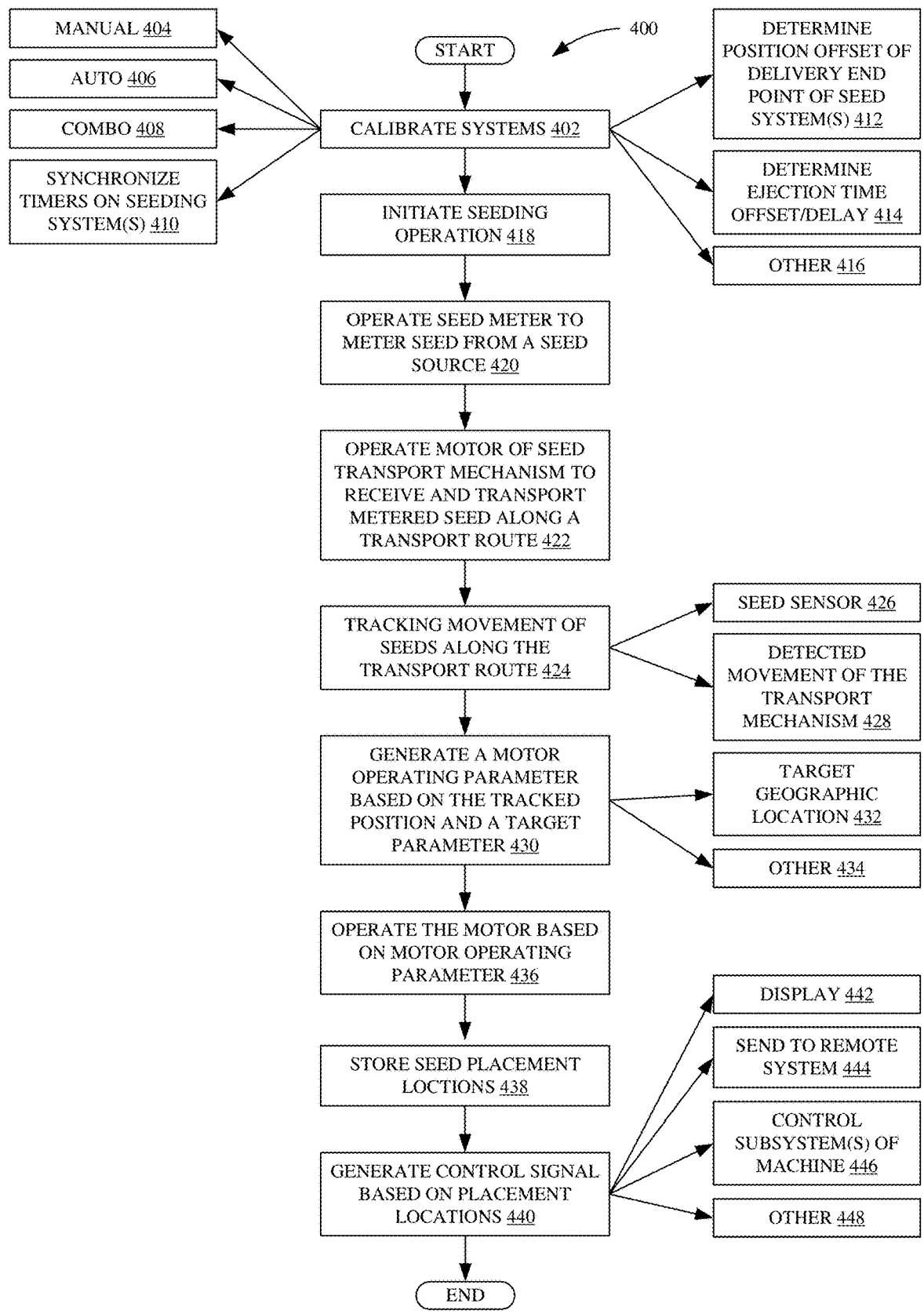
FIG. 5 is a flow diagram of one example operation of an agricultural machine.

FIG. 5 is a flow diagram 400 illustrating an example operation of an agricultural machine. For sake of illustration, but not by limitation, FIG. 5 will be described in the context of agricultural machine 200 illustrated in FIG. 4.

At block 402, the systems of machine 200 are calibrated or otherwise configured for operation. This can be done manually (represented by block 404), automatically (represented by block 406), or a combination of manual or automatic processes (block 408).

In one example, block 402 includes synchronizing timers 234 and 235, which are utilized for sending and receiving control signals and messages between processing system 238 and seeding system 202. This is represented by block 410. In one example, timers 234 and 235 comprise parallel independent clocks running on corresponding processing units that are synchronized in time on the order of ten to one hundred microseconds. Timers 234 and 235 can be synchronized in any of a variety of ways. In one example, a message or other signal is sent between systems 202 and 238 using any suitable communication protocol. In one example, a separate physical hardware bus provides a signal line between the systems for timer synchronization. Of course, this is only one example. After timer synchronization, a message sent by a sending one of the systems includes a timestamp generated (using timestamp generator 249) based on a time of the timer (234 or 235) of the sending system. The timer (234 or 235) of the receiving system can then be utilized to determine latency in the communication of the message through the communication channel. The receiving system can then account for a latency delay, in particular when using communication protocols such as CAN message-based communication. Further, the timestamps and corresponding timer(s) can be used to extrapolate values to use between the sending and receiving of the messages.

For the sake of illustration, as noted above CAN bus messages are often limited by sampling rate. Timestamps can be bundled with the data broadcast in the CAN messages to enable the receivers of the data to extrapolate higher accuracy data, such as position or time estimates. For instance, assume a scenario in which motor sensor 220 sends periodic messages indicating the angular position of the output shaft of motor 218. If each of these messages is timestamped based on the current value of timer 234, then using the value of timer 235 processing system 238 can extrapolate the position at intervening times between those messages. Thus, if a seed is detected by seed sensor 222 at a time between the messages sent by motor sensor 220, then processing system 238 can accurately determine the position of the seed relative to the motor output shaft by extrapolating the position of the output shaft from the timestamped messages sent by motor sensor 220.

Likewise, a corresponding extrapolation process can be utilized to determine seed spacing between adjacent seeds in seed transport mechanism 216 by using the detected velocity of seed transport mechanism 216 (based on signals from motor sensor 220) and timestamps of the corresponding seed presence signals generated by seed sensor 222, for those adjacent seeds.

It is worth noting that, in some implementations, motor 218 can be directly coupled to seed transport mechanism 216. In other examples, the output shaft of motor 218 can be coupled to seed transport mechanism 216 through a transmission, such as a set of gears at a particular gear ratio. The gear ratio of the transmission can be utilized to determine the position of the seed transport mechanism 216, and thus seeds carried along the transport route, relative to the position of the output shaft of motor 218.

At block 412, a position offset of each delivery endpoint component (i.e., the delivery endpoint component 228 on each row unit) is determined. The position offset represents a difference between the position sensed by the position sensor (i.e., position sensor 266 in FIG. 4) associated with machine 200 and the particular location of the endpoint component 228. The position sensor may be located on a central frame of machine 200, on a support vehicle such as a towing tractor, or otherwise. The position offset represents an x-y coordinate displacement from that sensor location. Using the position offset, the precise location of each endpoint component 228 can be determined based on the sensor signal generated by the position sensor 266.

At block 414, an ejection time offset or delay is determined based on the characteristics of seed delivery system 206. As mentioned above, an ejection time offset or delay represents an estimated time that it will take a seed that is released from seed transport mechanism 216 to reach the furrow. This offset or delay is based, at least in part, on the size, shape, and/or geometry of the delivery endpoint component 228, and any intermediate components that connect component 228 to the release position of mechanism 216. Of course, the systems can be calibrated in other ways as well. This is represented by block 416.

At block 418, a seeding operation is initiated. This can be done manually based on inputs from operator 258, automatically, or otherwise. Once the seeding operation is initiated, seed meter 205 is operated to meter seed from a seed source, such as a seed tank or container to an interface between seed metering system 204 and seed delivery system 206, where the seed is handed off to seed transport mechanism 216. This is represented by block 420.

At block 422, motor 218 of seed delivery system 206 is operated to move seed transport mechanism 216 to transport the metered seed, received from seed meter 205, along a transport route to a second, release position in which the seed is released. Movement of the seeds along the transport route is tracked at block 424. Illustratively, this is based on a seed presence signal (indicative of seed presence at the sensor location) received from seed sensor 222 and detected by seed presence detector 286. This is represented by block 426. The movement of the seeds is also tracked based on detected movement of transport mechanism 216. In one example, this is based on a signal from motor sensor 220, which indicates the change in angular position of the output shaft of motor 218, which in turn indicates the amount of movement of seed transport mechanism 216 (e.g., the bristles in the case of a brush belt) along the transport route for a given time period. This is represented by block 428.

As noted above, in the case where a transmission couples motor 218 to seed transport mechanism 216, movement of the transport mechanism can be detected based on the angular change is position of the output shaft of motor 218, taking into account a gear ratio between the output shaft and mechanism 216.

At block 430, a motor operating parameter is generated based on the tracked position of the seed and a target for releasing the seed onto the terrain (e.g., into the furrow created by furrow opener 226). In one example, a target parameter includes, or is otherwise indicative of, a target geographic location (block 432). This can be a global or absolute geographic location, such as latitude and longitudinal coordinates, or can be relative to a particular location on the terrain (such as the location of a prior seed placement). Of course, the motor operating parameter can be generated in other ways as well. This is represented by block 434. At block 436, motor 218 is operated to drive movement of seed transport mechanism 216 based on the motor operating parameter.

At block 438, seed placement locations for the seeds are stored. In one example, this information is stored as planting maps 282 in data store 274. A planting map 282 represents the actual seed planting locations as, for example, a dot matrix or other suitable representation. A planting map 282 can be utilized during a subsequent spraying operation, a subsequent harvesting operation, and/or a planting operation in a subsequent year. For example, it may be that the harvesting operation utilizes the information as estimated yield data for specific areas of the field. In another example, planting operations in a subsequent year may use the planting maps from the prior year so that crop rows are placed in an area of the field that resides between the crop rows from the prior year.

At block 440, a control signal is generated based on the seed placement locations. In one example, the control signal can control a display on, or associated with, machine 200 to display the seed placement locations. This is represented by block 442. Alternatively, or in addition, the seed placement location information can be sent to remote system 250. This is represented by block 444. In another example, subsystems of machine 200 can be controlled. This is represented by block 446.

For example, but not by limitation, chemical application controller 262 can control application system 265 to apply a crop care chemical on and/or adjacent to the seed location. Depending on the type of seed and/or the type of chemical, the chemical may be placed directly on the seeds, or intentionally away from (e.g., in between) seeds within specific distance ranges.

Of course, control systems can be generated in other ways as well. This is represented by block 448.

Figure 6:
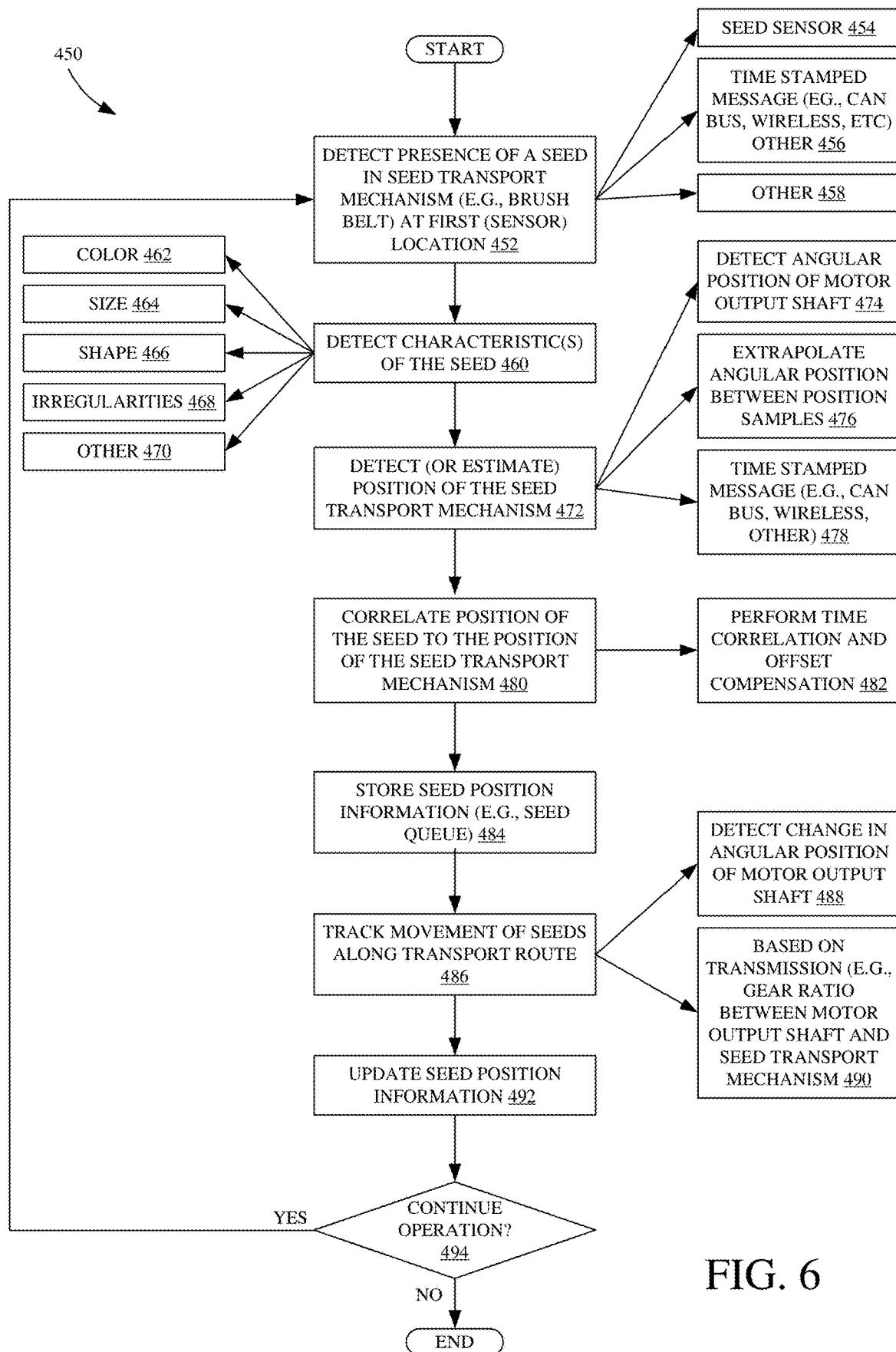
FIG. 6 is a flow diagram of one example operation of a seed tracking system.

FIG. 6 is a flow diagram 450 illustrating one example of operation of a seed tracking system. For sake of illustration, but not by limitation, FIG. 6 will be discussed in the context of seed tracking system 240 illustrated in FIG. 4.

At block 452, presence of a seed in seed transport mechanism 216 is detected at a first (sensor) location (e.g., at the location of sensor 153 in FIG. 3A). In the illustrated example, this is based on a signal generated by seed sensor 220, which is indicated by block 454. In one example, a time-stamped message is received from controller 230 through communication system 248, using timestamp generator 259. The timestamp is indicative of a time of timer 234 when the seed presence was detected. This is represented by block 456. Of course, presence of the seed can be detected in other ways as well. This is represented by block 458.

In one example, a characteristic of the seed can be detected. This is represented by block 460. For example, seed sensor 222 (and/or another sensor) can generate a signal indicative of a color (block 462), a size (block 464), a shape (block 466), and/or irregularities (block 468) of the seed. Of course, other characteristics can be detected as well. This is represented by block 470.

Based on the characteristics detected at block 460, seed characteristic determination component 288 can determine that the seed detected a block 452 is a typical seed, is an atypical seed (it has irregularities, such as being cracked) and/or is likely not a seed (e.g., foreign material, such as a different type of seed).

At block 472, a position of the seed transport mechanism is detected or estimated. This can be done based on detecting the angular position of the motor output shaft, which is indicated by block 474. Alternatively, or in addition, the angular position of the output shaft can be extrapolated based on other detected angular positions. This is represented by block 476. For example, if the position of the motor output shaft is sampled every 10 milliseconds, then the position of the output shaft between those samples can be extrapolated based on the positions and corresponding rotational speed.

At block 478, the position information is received from controller 230 in a time-stamped message, that is time-stamped by timestamp generator 249 based on timer 234. As discussed above, the timestamps can be utilized to account for latency in the communications through communication system 248.

At block 480, based on a valid seed detection, the position of the seed is correlated to the position of the seed transport mechanism. For example, block 480 associates the angular position of the motor output shaft, at the time the seed is detected by seed sensor 222, with the location of the seed at the sensor location. In one example, this includes component 298 performing time correlation and offset compensation, examples of which are discussed above. This is represented by block 482.

At block 484, the seed position information is stored, for example in seed tracking queue 296. In this example, at a given moment in time, seed tracking queue 296 stores representations of each seed currently in seed transport mechanism 216, and corresponding position information, correlated to the angular rotation position of the motor output shaft.

At block 486, seed tracking system 240 tracks movements of the seeds along the transport route, as seed transport mechanism 216 is moved by motor 218. In this example, the movement is tracked based on a detected change in the angular position of the motor output shaft, which is represented by block 488. Also, the movement can be tracked, taking into account any gear ratio or other transmission change between motor 218 and seed transport mechanism 216. This is represented by block 490.

At block 492, the seed position information in seed tracking queue 296 is updated to reflect the new position information based on the movement tracked at block 486. At block 494, operation is continued for any subsequent seeds that are detected by the seed sensor.

Figure 7:
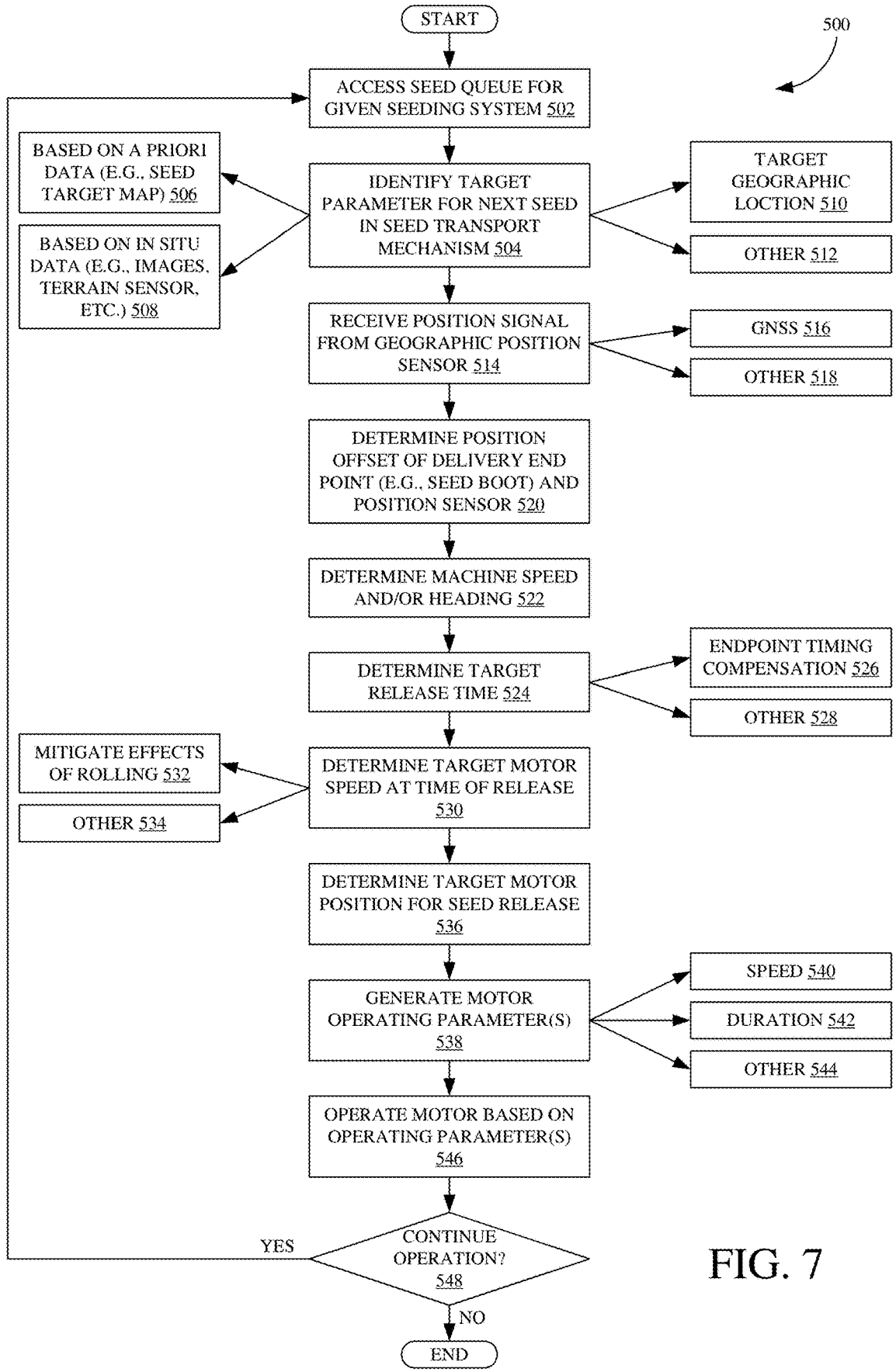
FIG. 7 is a flow diagram of one example operation of controlling a seeding system based on tracked seed movements.

FIG. 7 is a flow diagram 500 illustrating one example of controlling a seeding system based on tracked seed movements. For sake of illustration, but not by limitation, FIG. 7 will be discussed in the context of seed ejection system 242 illustrated in FIG. 4.

At block 502, a seed tracking queue is accessed for a particular seeding system. In one example, as noted above, seeding system 202 corresponds to a particular row unit, of a plurality of row units, on machine 200. Thus, the operation shown in FIG. 7 can be performed for each row unit, on a separate row unit-by-row unit basis.

Based on the seed tracking queue for seeding system 202, a target parameter is identified for a next seed in seed transport mechanism 216. This is represented by block 504.

The target parameter can be identified in any of a number of ways. In one example, it is based on a priori data, such as a pre-defined seed target map. A seed target map can take a variety of different forms. For example, in one instance it includes a dot matrix or other model that identifies specific geographic locations of individual seeds. This is represented by block 506. Alternatively, or in addition, the target parameter can be identified based in situ data. This is represented by block 508. Sensors on or otherwise associated with machine 200 can obtain this data as the planting operation occurs.

The target parameter identifies, in one example, a target location. This is represented by block 510. As noted above, the target location can be a global geographic position, such as a position represented by longitude and latitude coordinates on a global coordinate system. In another example, the target geographic location can represent a spacing from the location of a prior seed released from seeding system 202 into the furrow. This can compensate for a seed skip (e.g., an absence of seed between two positions or receiving cells of the seed meter where a seed would normally be present).

For sake of illustration, a desired seed spacing can be determined based on a target population (e.g., seeds per acre, etc.). The desired seed spacing can be received by operator input, from remote system 250, or otherwise. Also, if the prior seed placed in the seed transport mechanism 216 was detected to have an irregularity (e.g., cracked seed, half seed, etc.) or other characteristic that is likely to prevent or hinder germination, then the target geographic location can be set in close proximity to that prior seed, so that the current seed effectively replaces the prior seed in the sequence of spaced seeds in row.

The target geographic location can also be determined based on obstacles or other objects sensed on the terrain. For instance, it can be based on adverse soil conditions, field boundaries, obstacles such as rocks, fence lines, power line poles, etc. This can be detected by imaging system 269, or otherwise.

Of course, the target parameter can be identified in other ways as well. This is represented by block 512.

At block 514, a position signal is received from position sensor 266. This can include a signal from GNSS receiver 270. This is represented by block 516. Of course, the position signal can be received in other ways as well. This is represented by block 518.

A position offset between the delivery endpoint component 228 and the location of position sensor 266 is determined. This is represented by block 520. At block 522, a speed and/or heading of machine 200 across the terrain is determined.

Based on the target geographic location, the location of delivery endpoint component 228 determined based on the position offset, and the machine speed, a target ejection or release time is determined at block 524. As noted above, this can be based on endpoint timing compensation at block 526. For example, the target ejection time can take into account an estimated amount of time it will take the seed to travel into the furrow after it is released from seed transport mechanism 216. The target ejection time can be determined in other ways as well. This is represented by block 528.

At block 530, the target motor speed at the time of seed release is determined. In one example, the target motor speed is set so that the lateral speed of the seed, as it is released from seed transport mechanism 216, conforms to (e.g., closely matches) the speed of machine 200 to mitigate the effects of the seed rolling along the furrow, which may cause the seed to deviate from the target geographic location. This is represented by block 532. The target motor speed can be determined in other ways as well. This is represented by block 534.

At block 536, a target motor position is determined for the release of the seed. The target motor position is illustratively the angular position of the motor output shaft at which the seed will be at the release position of the seed transport mechanism 216, such that it is ejected from seed transport mechanism 216 toward component 228.

At block 538, motor operating parameters are generated based on the determinations at blocks 524-536. This can include a motor speed for driving seed transport mechanism 216. This is represented by block 540. Also, the motor operating position can include a duration for operating the motor at the particular speed. This is represented by block 542. Of course, other motor operating parameters can be generated as well. This is represented by block 544.

In one example, the motor operating parameter is generated at block 538 indicate a series of motor adjustments, so that the motor increases speed so the seed approaches the release location relatively quickly, in accordance with the target release time, and then slows to more closely match the machine speed to mitigate the effects of rolling. In other words, the speed at block 540 can be greater than the target motor speed determined at block 530, and then, prior to the seed release, the motor is slowed to the target motor speed.

At block 546, the motor is operated based on the operating parameters. In one example, this includes controller 246 sending the motor operating parameters to controller 230, which controls motor 218 in accordance therewith.

If the operation is continued at block 548, the operation returns to block 502 where a next seed in the queue is identified and the seed transport mechanism 216 is operated to release the next seed at the next target geographic location.

Figure 8:
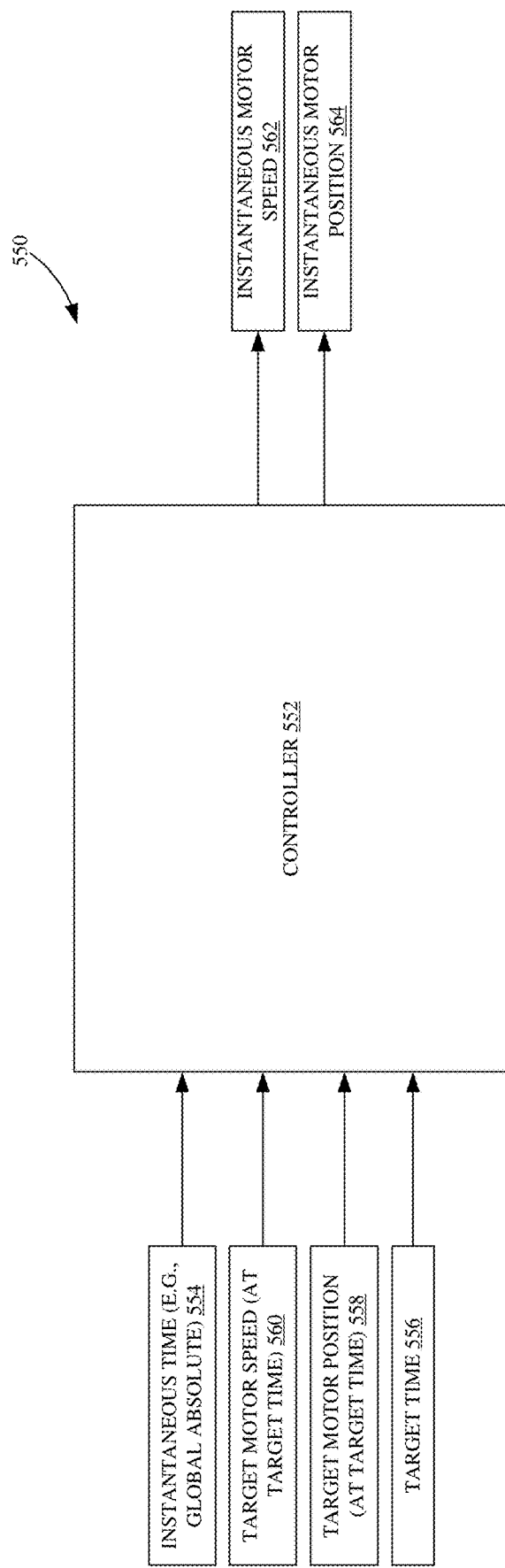
FIG. 8 is a schematic diagram illustrating one example of a control system for a seeding system.

FIG. 8 is a schematic diagram illustrating one example of a control system for a seeding system. Control system 550 includes a controller 552, such as controller 230 illustrated in FIG. 4. Controller 552 receives an indication of an instantaneous time 554. In one example, this time is determined by timer 234.

Controller 552 also receives a target time 556 for releasing a seed from seed transport mechanism 216. Controller 552 also receives a target motor position 558 at the target time 556. Controller 552 also receives a target motor speed 560 at the target time 556. Based on inputs 554-560, controller 552 generates an indication of a motor speed 562 for controlling motor 218 to drive seed transport mechanism 216. Controller 552 can also output a motor position 564, indicative of the angular position of the output shaft of motor 218.

Figure 9:
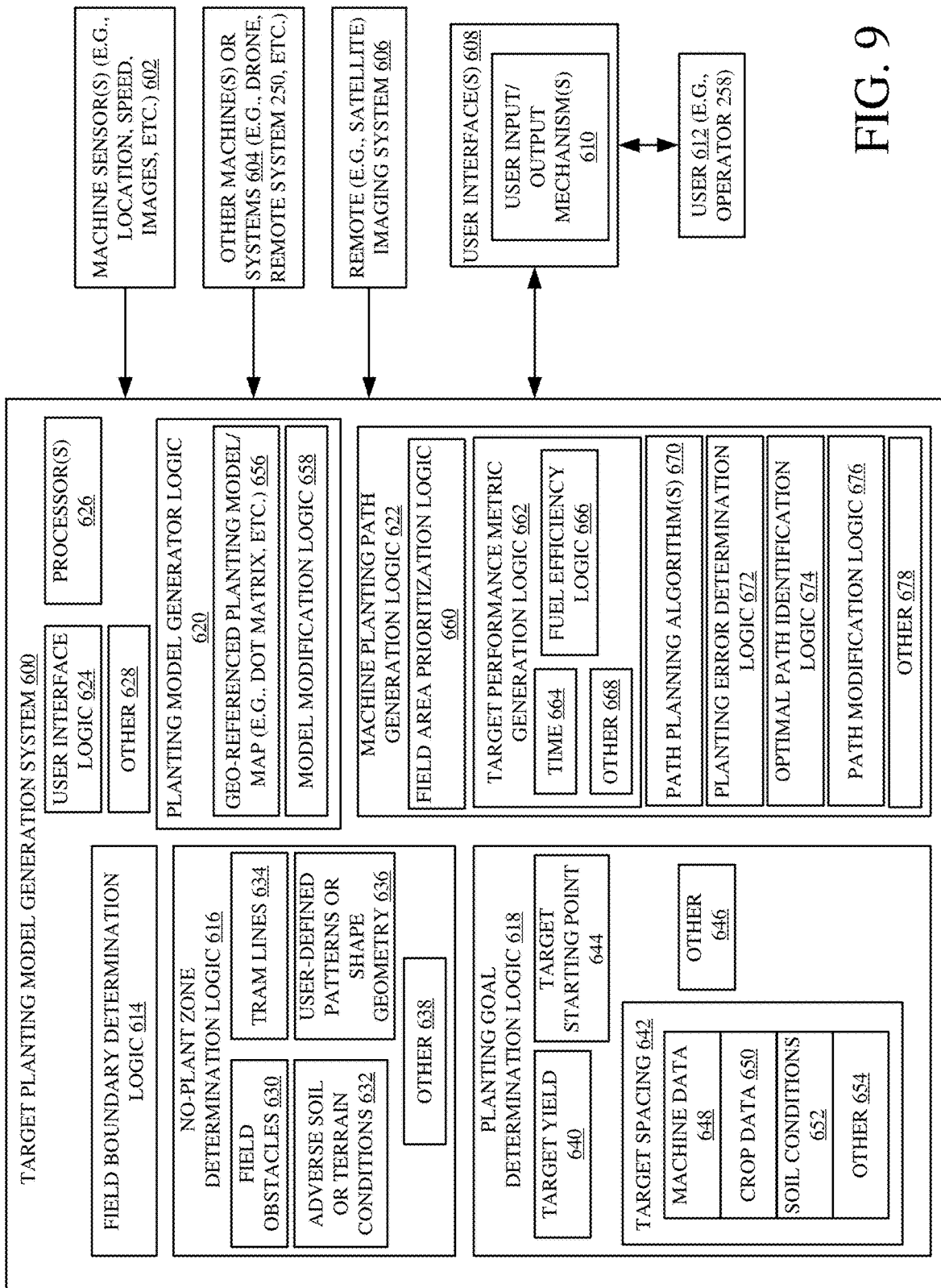
FIG. 9 is a block diagram illustrating one example of a target planting model generation system.

FIG. 9 is a block diagram illustrating one example of a target planting model generation system 600. System 600 is configured to generate a target planting model, such as a map that defines locations for planting seeds on a field or other worksite. One example of a planting model is a dot matrix, where each dot or point in a two-dimensional array represents a particular planting location geo-referenced to coordinates in a global or local coordinate system. For sake of illustration, but not by limitation, system 600 will be described in the context of agricultural machine 200 discussed above with respect to FIG. 4. Illustratively, system 600 is deployed within processing system 238 to generate target seed planting data 280 that is utilized by seed ejection system 242 to eject seeds from seeding system 202.

System 600 is configured to receive inputs from a plurality of sources including, but not limited to, machine sensor(s) 602 associated with machine 200, other machines 604, remote imaging systems 606, and/or user interfaces 608. Examples of user interfaces 608 are described above with respect to operator interface mechanisms 256. Accordingly, user interfaces 608 include user input and/or output mechanisms 610 that are interacted with by a user 612, such as operator 258 illustrated above with respect to FIG. 4.

Examples inputs from machine sensors 602 include location signals from position sensors 266 indicative of a geographic position of machine 200, speed signals from speed sensors 268 indicating a current speed and/or heading of machine 200, and/or images from imaging system 269. Of course, other sensor inputs can be received as well. Examples of other machine(s) 604 include, but are not limited to, remote system 250, other agricultural machines, an unmanned aerial vehicle (UAV) or drone, etc.

Before discussing example operations of system 600 in generating a target planting model, an overview of system 600 will be provided. System 600 includes field boundary determination logic 614 configured to determine or otherwise identify a boundary of a field or other worksite for which the target planting model is being generated. System 600 includes no-plant zone determination logic 616, planting goal determination logic 618, planting model generator logic 620, and machine planting path generation logic 622. System 600 includes user interface logic 624 configured to generate user interfaces 608 and to receive inputs from those interfaces. System 600 can also include one or more processors 626, and can include other items 628 as well.

No-plant zone determination logic 616 is configured to identify zones or areas of the subject worksite (i.e., field) that are not to be planted with seeds (referred to herein as "no-plant zones"). No-plant zones can be determined in a number of ways. For example, they can be determined based on the identification of field obstacles 630. In one example, field obstacles 630 are identified based on one or more of inputs from machine sensor(s) 602, machine(s) 604, and/or imaging system 606. Field obstacle 630 can include any type of obstacle that prevents, or at least inhibits, the movement of machine 200 across the field and/or the planting of seed. For example, this can include trees, water, rocks, power lines, fences, and the like.

No-plant zones can be determined based on adverse soil or terrain conditions (block 632). For example, areas that have a steep incline (e.g., a slope above a threshold), saturated soil, low expected yield (e.g., based on prior harvest data, etc.) can be identified. Also, no-plant zones can comprise tram lines 634. A tram line 634 defines an area of a field that is designated for the traversal of machinery (e.g., sprayers, harvesters, etc.). The area is designated as a no-plant zone for the wheels, tracks, or other ground engaging elements of the machinery, which would otherwise be expected to damage or destroy crop planted in that area.

In one example, the location of tram lines can be determined based on the machines that are expected to be subsequently utilized in the field. For instance, tram lines can be defined based on a planned path through the field, and the wheel spacing and tire size of a sprayer that operator 258 (or other user) will use in a subsequent spraying operation.

Also, no-plant zones can be generated based on user-defined patterns or shape geometries 636. Patterns or shape geometries 636 refers to any non-typical or irregular seed placement, which can represent a desired appearance when the crop grows. Examples include, but are not limited to, a corn maze, words or characters, icons, to name a few.

Of course, no-plant zones can be generated in other ways as well. This is represented by block 638.

Planting goal determination logic 618 is configured to identify planting goals for the target planting model. This can include, but is not limited to, a target yield 640, target crop spacing 642, and/or target start point 644 in the field. Of course, other planting goals can be determined as well. This is represented by block 646.

Target yield 640 is utilized to determine a number of seeds to be planted in the subject field, a number of seeds to be planted per acre in the field, or otherwise. Target spacing 642 can be determined based on machine data 648, crop data 650, soil conditions 652, or otherwise (block 654). Examples of machine data 648 include row unit spacings on machine 200. In another example, machine data 648 can indicate a maximum planting rate (e.g., seeds per second) that can be metered from metering system 204 and/or conveyed by delivery system 206. Crop data 650 can indicate attributes of a type of crop to be planted with the target planting model. The crop data 650 is therefore utilized to indicate a minimum and/or maximum spacing between the crop rows. Soil conditions can be utilized to optimize the target spacing to increase the expected yield. For example, if soil conditions 652 indicate favorable growing conditions, the row and/or crop spacing within the rows can be reduced.

Target start point 644 identifies the location within the subject field to start the planting operation. For instance, this can be determined based on access points to the field, headlands, etc.

Planting model generator logic 620 is configured to generate the planting model utilizing the field boundary determined by logic 614, no-plant zone(s) determined by logic 616, and any planting goals determined by logic 618. Logic 620 generates a geo-referenced planting map 656. In one example, this includes a dot matrix or other suitable representation. Each point or dot on the planting map represents a particular seed location having an associated set of coordinates defined in a global coordinate system, local coordinate system, or otherwise.

In any case, planting model 656 includes location information that is utilized to control seeding system 202 to place a sequence of spaced seeds corresponding to each location on the planting model. Planting model generator logic 620 can use any suitable algorithm for planning seed locations on the field. For example, a seed placement location algorithm can leverage soil type and/or topography differences across the field, maximize seed population for a given field area, obstacle or other no-plant zone avoidance. Further, the logic 620 can preferentially orient crop rows in cardinal directions, based on user preference, or otherwise. Examples of planting model generation are described in further detail below.

Logic 620 can also include model modification logic 658 configured to modify a given planting model, for example based on user input through user interfaces 608 or otherwise.

Machine planting path generation logic 622 is configured to generate a target traversal path for machine 200 to achieve the planting locations defined by the target planting model. Logic 622 includes field area prioritization logic 660 that can preferentially prioritize different areas of the field in a planting order. In one example, headlands (e.g., areas proximate a point of entry to/exit from the field, areas that are at an end of the field and used during machine turning between field passes, etc.) are assigned a lowest priority, so that they are planted at or towards the end of the planting operation to avoid machine 200 passing over those areas after seeds have been planting.

Logic 622 includes target performance metric generation logic 662 configured to generate or otherwise identify target performance metrics for the planting operation. This can be done in any of a number of ways and based on any of a number of parameters or constraints. In one example, a target performance metric comprises a time metric that indicates a target time for completion of the planting operation, or at least indicates that a reduced planting time has a high priority. This is represented by block 664. A target performance metric can also include fuel efficiency, indicative of a target fuel consumption, in terms of total fuel used, fuel used per hour, or otherwise. This is represented by block 666. Of course, other target performance metrics can be generated as well. This is represented by block 668.

One or more path planning algorithm(s) 670 are configured to generate hypothetical machine traversal paths for the target planting model. In one example, this includes motion planning, in which a desired movement task is dissected into discreet motions that satisfy movement constraints, and can optimize one or more aspects of the movement. Any suitable type of path planning algorithm 670 can be utilized in generating one or more potential traversal paths through the target planting model.

Planting path generation logic 622 includes planting error determination logic 672 configured to determine a spatial planting error for a given planting path. For sake of illustration, for a given row unit spacing on machine 200, a particular seed planting location defined in the target planting model may not be precisely hit (i.e., traversed over) by any one of the row units on machine 200. While the closest row unit to that particular seed planting location can be selected to plant at that location, the offset between the actual planting location and the target location for that seed in the target planting model is referred to as a planting error.

Optimal path identification logic 674 is configured to select or otherwise identify a planting path to be utilized for operation of machine 200. In one example, this includes a path that leverages the target performance metrics relative to the expected planting error for that path as determined by logic 672. An optimal path can be identified as the path that results in the lowest planting error, while meeting the target performance metrics.

Path modification logic 676 is configured to modify the planting path. In one example, logic 676, for example using user interface logic 624, renders a representation of a path on user interfaces 608 and receives user input that modifies one or more portions of the path. Logic 622 can include other items as well. This is represented by block 678.

Figure 10:
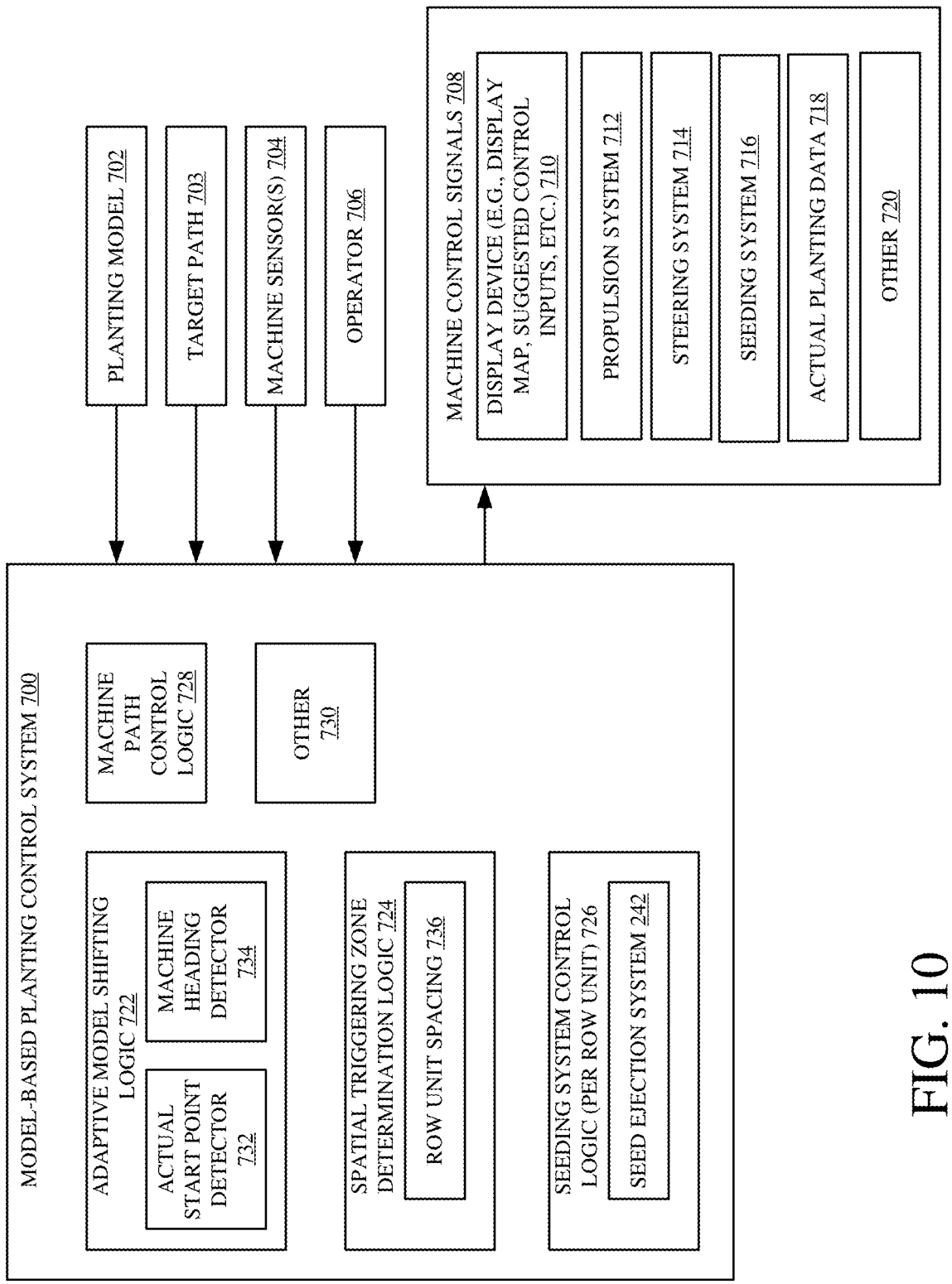
FIG. 10 is a block diagram illustrating one example of a model-based planting control system.

FIG. 10 is a block diagram illustrating one example of a model-based planting control system 700. For sake of illustration, but not by limitation, system 700 will be described in the context of agricultural machine 200 discussed above with respect to FIG. 4.

System 700 is configured to receive inputs from a plurality of sources. As illustrated, system 700 receives a target planting model 702, for example by accessing target seed planting data 280 in data store 274. Also, system 700 can receive a target machine path 703 corresponding to the target planting model 702, inputs from machine sensors 704, and/or inputs from operator 706 (e.g., operator 258 illustrated in FIG. 4).

Examples of inputs from machine sensors 704 include location signals from position sensors 266 indicative of a geographic position of machine 200, speed signals from speed sensors 268 indicating a current speed and/or heading of machine 200, and images from imaging system 269. Of course, other sensor inputs can be received as well.

Examples of user interfaces are described above with respect to operator interface mechanisms 256. Accordingly, user interfaces include user input and/or output mechanisms that are interacted with by operator 706.

System 700 is illustrated as generating machine control signals 708. This can include, but is not limited to, control signals that control a display device 710 of machine 200, for example to render a representation of the planting model to operator 258, to output suggested control inputs, or other display device controls.

Also, machine control signals 708 can control one or more of a propulsion system 712 of machine 200 to control a speed of machine 200, a steering system 714 of machine 200 to control a heading of machine 200, and/or seeding system 716 (e.g., seeding system 202 on one or more of the row units of machine 200). Also, machine control signal 708 can include controlling machine 200 to store and/or output actual planting data 718, representing the actual locations of the planted seeds. Of course, other machine control signals can be generated as well.

System 600 is configured to receive inputs from a plurality of sources including, but not limited to, machine sensor(s) 602, other machines 604, satellite imaging systems 606 and user interfaces 608. Examples of user interfaces 608 are described above with respect to operator interface mechanisms 256. Accordingly, user interfaces 608 include user input and/or output mechanisms 610 that are interacted with by a user 612, such as operator 258 illustrated above with respect to FIG. 4.

Examples of inputs from machine sensors 602 include location signals from position sensors 266 indicative of a geographic position of machine 200, speed signals from speed sensors 268 indicating a current speed and/or heading of machine 200, and images from imaging system 269. Of course, other sensor inputs can be received as well. This is represented by block 720.

System 700 includes adaptive model shifting logic 722, spatial triggering zone determination logic 724, seeding system control logic 726, machine path control logic 728, and can include other items 730 as well.

As discussed in further detail below, adaptive model shifting logic 722 is configured to adjust or shift the planting model 702 relative to the subject field based on an actual start point of the planting operation, detected by actual start point detector 732. Also, this can be based on the actual machine heading of machine 200, detected by machine heading detector 734.

Logic 724 is configured to determine a spatial triggering zone, for triggering the placement of a seed at the target locations. In one example, this is based on the row unit spacing 736, which represents the spacing between row units of machine 200. A spatial triggering zone represents a target region proximate the particular planting location with which the seed can be placed. For example, a spatial triggering zone can be defined to be within two inches of the coordinates of the particular target seed placement location. Thus, based on this spatial triggering zone, the row unit is triggered to eject the seed at the planting location when the row unit is within two inches of the target location.

The spatial triggering zone can be increased for larger row unit spacings and decreased for reduced row unit spacings. Logic 726 is configured to control the seeding system(s) on machine 200. In the example of FIG. 4, each row unit includes seed metering system 204 and seed delivery system 206 with seed transport mechanism 216 (e.g., rotating brush belt). In the illustrated example, logic 726 includes seed ejection system 242 discussed above with respect to FIG. 4.

Machine path control logic 728 is configured to generate control signals that represent the target machine path. This can include rendering a visual representation of the target machine path and/or providing suggested control inputs to operator 706. Alternatively, or in addition, logic 728 can generate control signals that control propulsion system 712 and/or steering system 714 to automatically control machine 200 to traverse the target path.

Figure 11:
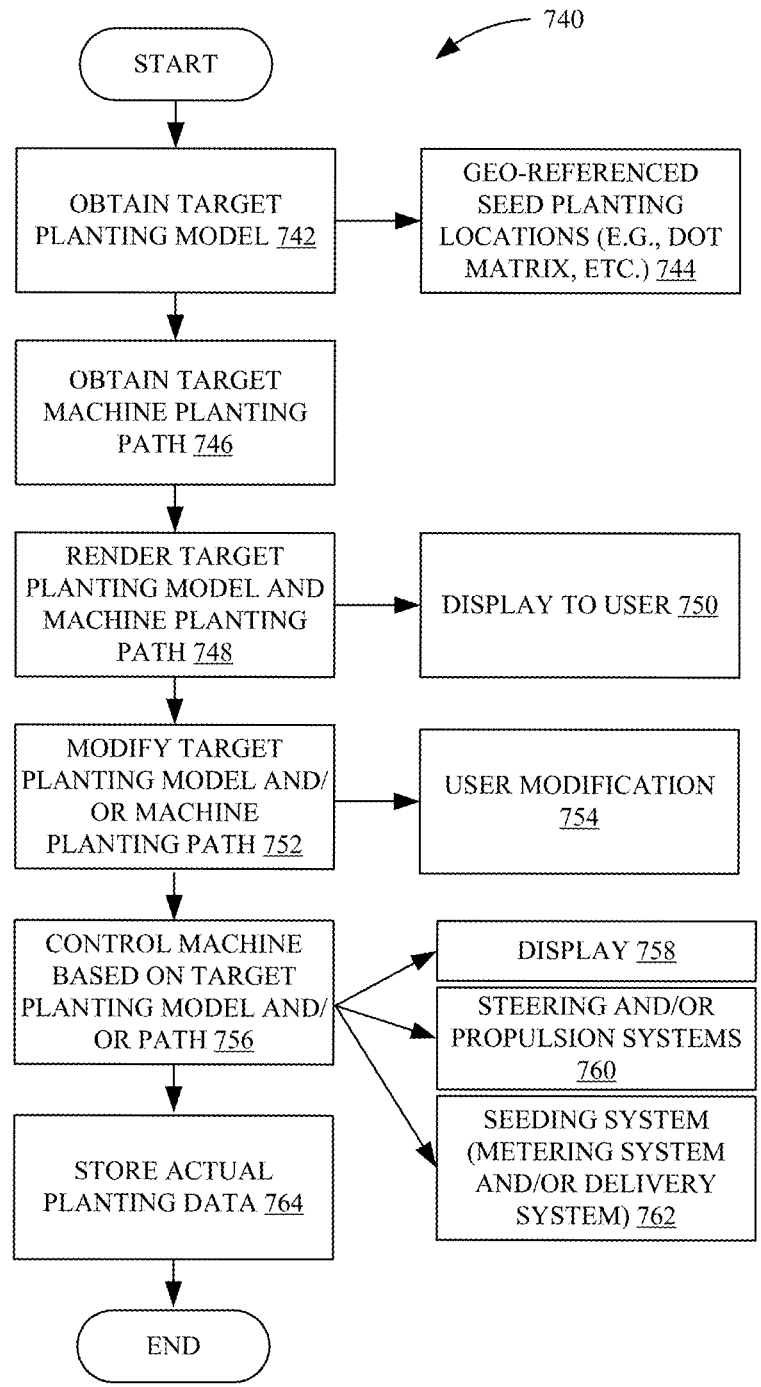
FIG. 11 is a flow diagram illustrating an example operation of target planting model generation and control system for an agricultural machine.

FIG. 11 is a flow diagram 740 illustrating an example operation of target planting model generation and control system for an agricultural machine. For sake of illustration, but not by limitation, FIG. 11 will be described in the context of machine 200 and systems 600 and 700 illustrated in FIGS. 4, 9, and 10, respectively.

At block 742, a target planting model is obtained. The target planting model illustratively includes geo-referenced seed planting locations 744. One example includes, but is not limited to, a dot matrix (or similar model) where each dot represents a particular seed with corresponding location information (e.g., global or local coordinates).

At block 746, a target machine planting path corresponding to the target planting model is obtained. The target planting model and machine planting path can be rendered at block 748. For example, this includes displaying the target planting model and machine planting path to the user (e.g., operator 258) at block 750. At block 752, one or more of the target planting model and machine planting path can be modified. This can include a user modification at block 754. For example, user 612 can interact with user input/output mechanism 610 to modify the target seed placements in the target planting model and/or the machine planting path.

At block 756, machine 200 is controlled based on the target planting model and/or path. This can include displaying the target planting model and/or target planting path (and corresponding suggested control inputs) at block 758. Also, this can include generating control signals to control steering system 714 and/or propulsion system 712. This is represented by block 760. At block 762, the seeding system is controlled to place seeds at the locations defined in the target planting model. For example, one or more of seeding system 202 and seed delivery system 206 is controlled. This is discussed in further detail below. Actual planting data that represents the planting locations can be stored at block 764. This planting data can also be provided to other machines, remote system 250, or otherwise.

Figure 12A:
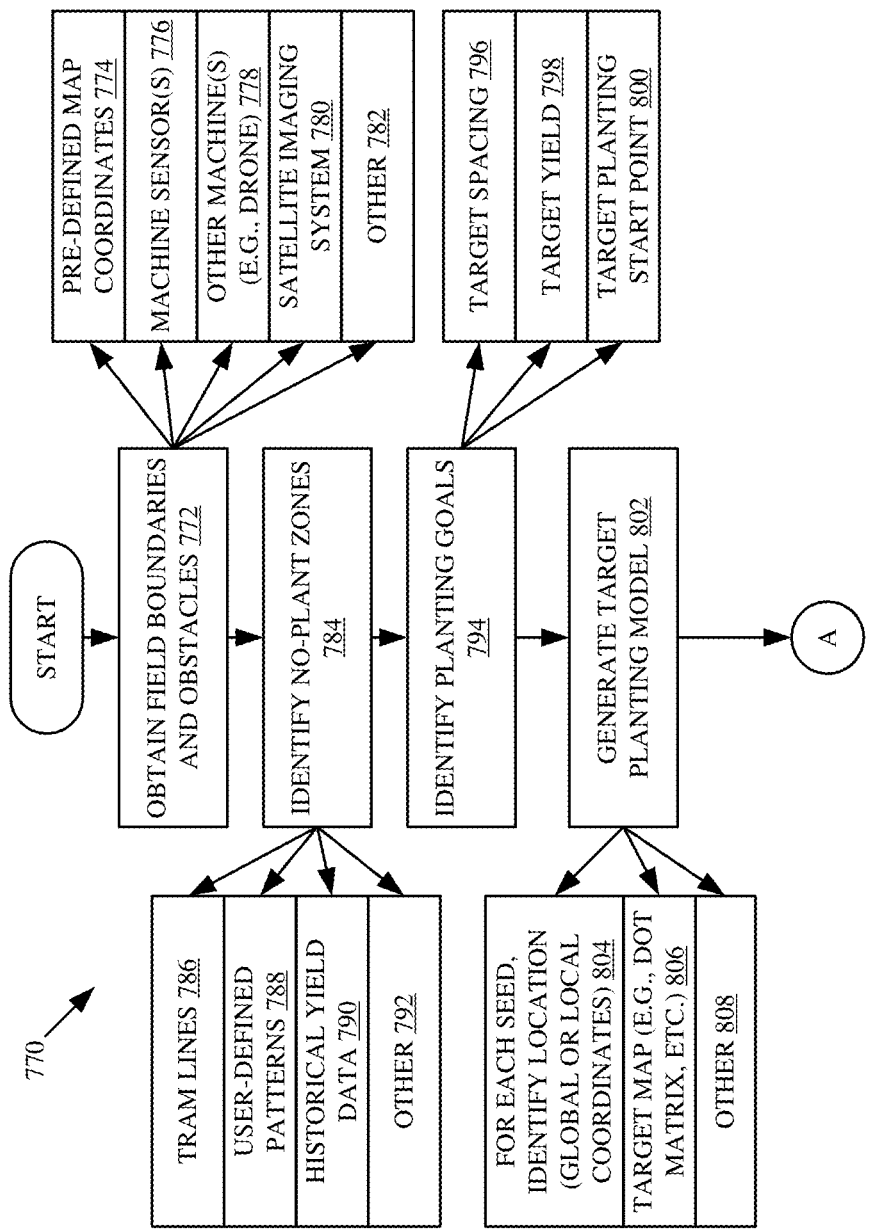
FIGS. 12A and 12B (collectively referred to as FIG. 12) is a flow diagram illustrating an example operation for generating a target planting model and planting path for an agricultural machine.
Figure 12B:
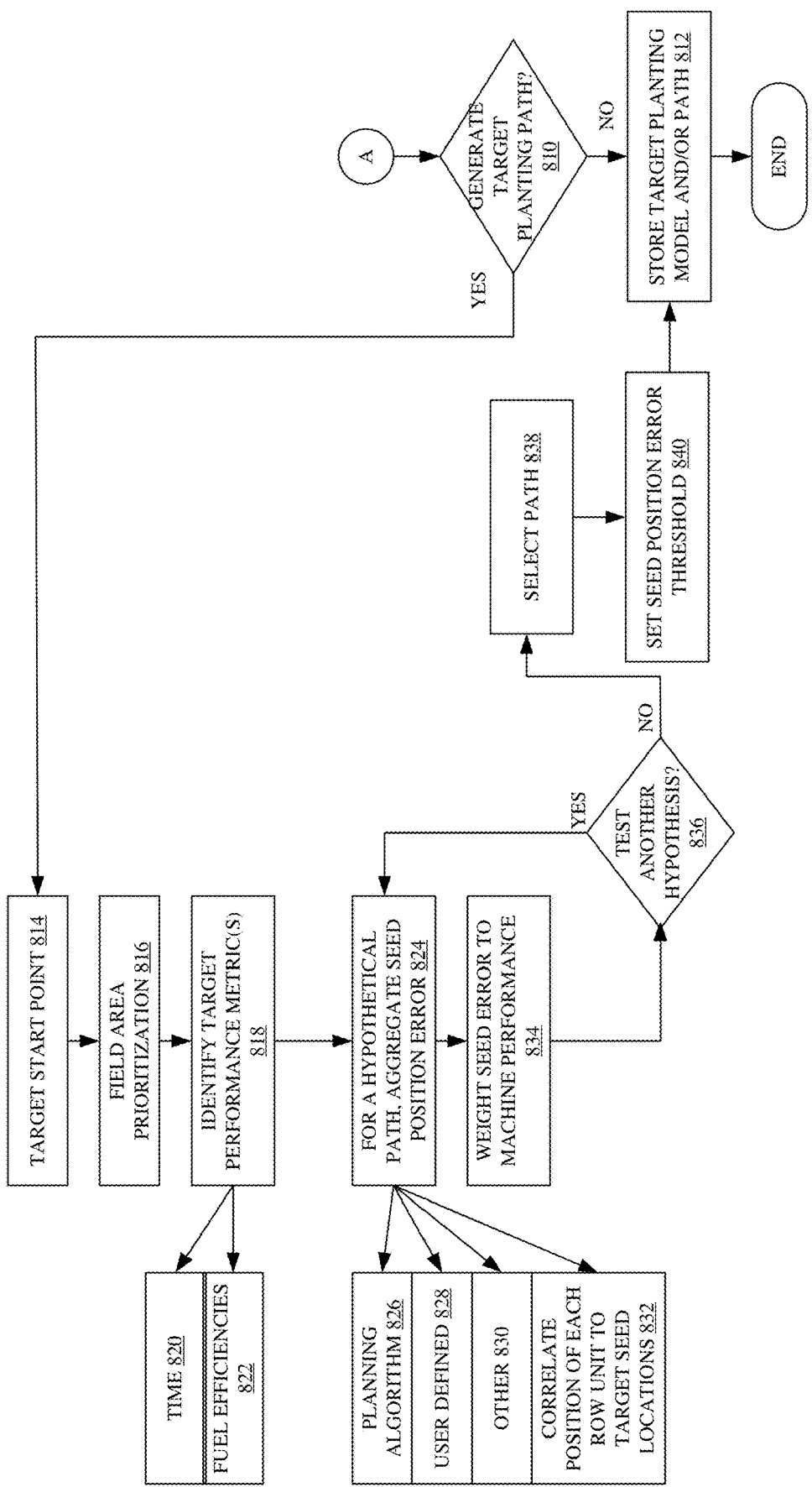

FIG. 12 is a flow diagram 770 illustrating an example operation for generating a target planting model and planting path for an agricultural machine. For sake of illustration, but not limitation, FIG. 12 will be illustrated in the context of machine 200 illustrated in FIG. 4 and target planting model generation system 600 illustrated in FIG. 9.

At block 772, field boundaries and/or obstacles for the particular field are obtained. This can include receiving or otherwise identifying pre-defined map coordinates that define the boundary of the field. This is represented by block 774. The field boundaries and/or obstacles can also be determined from machine sensors on machine 200 (block 776), input from other machines (block 778), such as a UAV or drone, or from remote imaging systems (block 780). Of course, field boundaries and obstacles can be obtained in other ways as well. This is represented by block 782.

At block 784, no-planting zones are identified. This can include the obstacles identified at block 772. Alternatively, or in addition, this can include the identification of tram lines 786, user-defined patterns 788, historical yield data 790, or other no-planting zones 792. As noted above, tram line 786 identifies areas that are not to be planted with seeds to accommodate operating equipment in the fields which can damage plants if they are run over. An example of a user defined pattern 788 is a corn maze. The no-plant zone identifies paths within that pattern that are to be free of crop. Historical yield data 790 can indicate areas of a field that historically have ow yields and are to be avoided during planting.

At block 794, planting goals are identified. This can include a target spacing between plants within a row and between rows. This is represented by block 796. Also, a target yield 798 can be identified. A target planting start point is identified at block 800.

At block 802, the target planting model is generated based on the field boundaries, no-plant zones, and planting goals. This includes, in one example, identifying locations for each seed in terms of global or local coordinates. This is represented by block 804. In one example, a target map is generated, such as a dot matrix. This is represented by block 806. Of course, the target planting model can be generated in other ways as well. This is represented by block 808.

At block 810, the operation determines whether a target planting path is to be generated. If not, the operation proceeds to block 812 in which the target planting model is stored.

If a target planting path is to be generated, the operation proceeds to block 814 in which a target start point is located within the field boundaries. Also, field areas within the field boundaries are prioritized at block 816 and target performance metrics are identified at block 818. Examples of this are discussed above. For instance, a target planting time can be identified at block 820. In this case, the target planting path is generated so as to traverse the field and reach all planting locations in the least amount of time, without regard to (or with little regard to) other performance metrics. Also, a target performance metric can include fuel efficiency at block 822.

At block 824, a hypothetical or potential planting path is determined and a corresponding aggregate seed position error is determined for that hypothetical path. The path can be determined based on a planning algorithm 826. Examples of this are discussed above. The hypothetical path can also be user defined (828), or it can be identified in other ways as well. This is represented by block 830.

In one example, seed position error is aggregated by correlating the position of each row unit to the target seed locations. This is represented by block 832. To illustrate, a position error is determined by identifying a closest row unit to the target location at any point during along the potential machine path. Thus, if this row unit is used to plant the corresponding seed, that seed will have its closest proximity to the target location. This offset represents a position error for the seed. By aggregating the seed position error over the entire path, an indication of inaccuracy of the planting path in terms of planting proximity to all planting locations is identified.

In one example, the seed position error aggregated at block 824 is weighted against machine performance. This correlates the seed position error to the machine performance. For example, a given hypothetical path may have a relatively low position error (e.g., many paths over the field are taken so that the row units match the seed placement locations with a small offset), but this results in a relatively high fuel consumption (and thus low fuel efficiency performance) due to the numerous paths required. Conversely, it may be that the machine can perform with high fuel efficiency, but with a slightly higher seed position error for another path.

At block 836, the method determines whether there are other hypothetical paths to test. If so, the operation returns to block 824 to identify the aggregate seed position error for the hypothetical path.

At block 838, one of the paths can be selected based on the selection criteria. The selection criteria can indicate, in one example, that seed position error is to be minimized while maintaining a target performance metric (e.g., productivity, time, fuel efficiency, etc).

For the selected path, a seed position error threshold can be set. This is represented by block 840. As discussed in further detail below, block 840 can determine, based on the machine path relative to the target planting locations, what the spatial triggering zone should be for the planting location. For instance, the planting path may indicate that the largest spatial zone will be three inches from any given planting location. This is used for triggering the seeding system for placing the seed within that spatial zone. This is discussed in further detail below. Again, the target planting model and/or path is stored at block 812.

Figure 13:
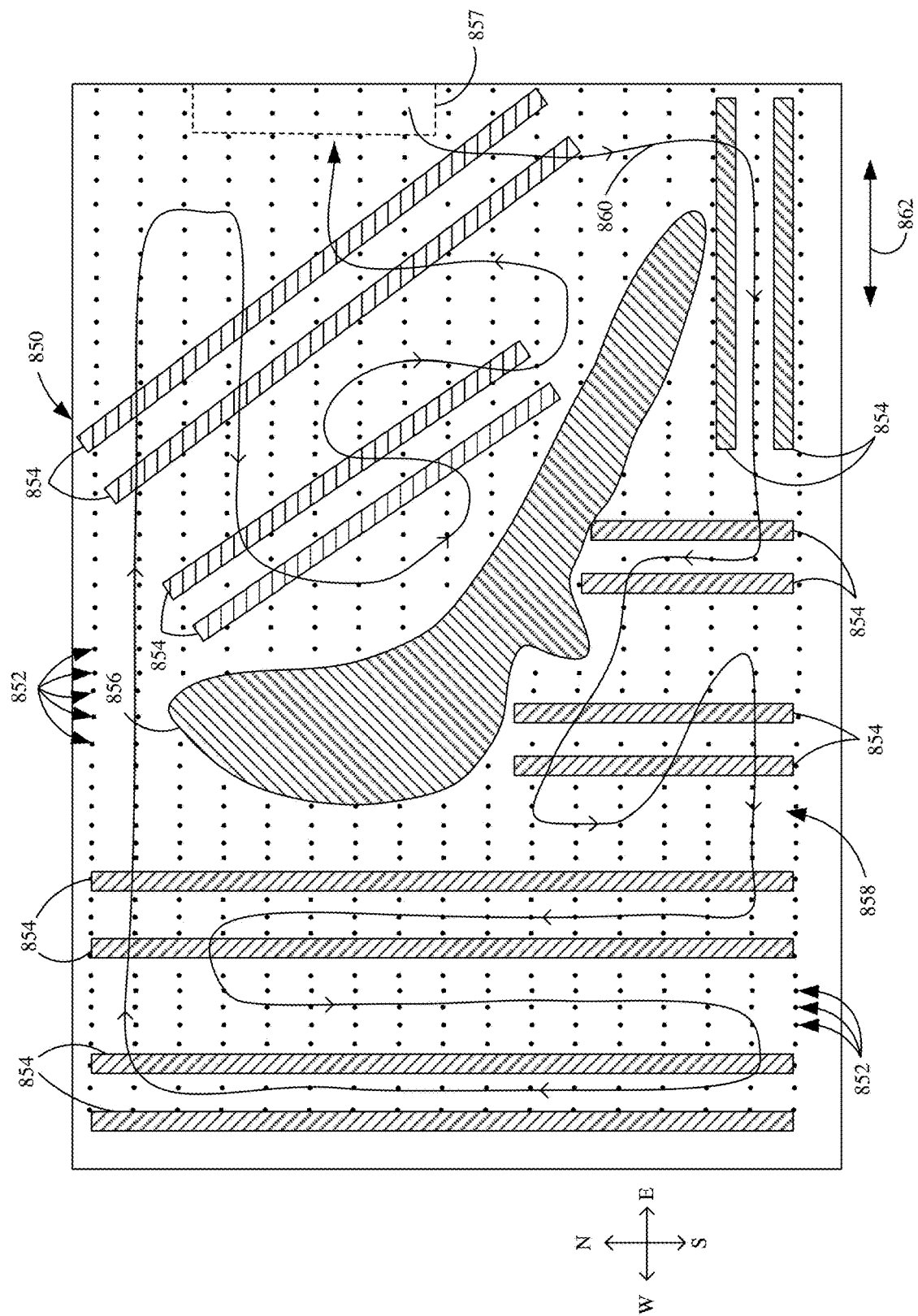
FIG. 13 illustrates one example of a target planting map.

FIG. 13 illustrates one example of a target planting map 850. Target planting map 850, in one example, is rendered on a user interface (e.g., interface mechanisms 256, user interfaces 608, etc.).

As shown, target planting map 850 defines a plurality of seed planting locations, represented by dots 852. Also, a plurality of tram lines 854 are identified along with one or more obstacles 856. These define no-plant zones. Box 857 represents a headland, corresponding to a field access point or region with which machine 200 will access the field 858 and/or corresponding to an area the machine will use to turn between subsequent passes over the field. As noted above, the area defined by headland 857 can be assigned a lowest priority in the planting order so that it will be planted toward the end of the planting operation (e.g., as the machine leaves the field).

A target planting path is represented by arrow 860. Illustratively, path 860 has been determined to represent a path in which the row units of machine 200 will reach substantially all of the identified seed planting locations within the spatial triggering zones of those planting locations.

It is noted that in the example of FIG. 13, the crop rows are oriented in a direction represented by arrow 862. That is, in the illustrated example, the rows are oriented in an West-East direction. However, in planting the rows in this orientation, the machine path controls the machine, for at least some of the areas of field 858, the machine traverses the field in a direction that is non-parallel to the rows, while the machine plants the crop rows in the West-East orientation. Accordingly, the seeds are planted in rows without regard to the direction the machine is driven over the field. Therefore, in one example, machine 200 can traverse the field in random paths, while seeding system 202 is controlled to plant seeds in parallel rows. This is discussed in further detail below.

Figure 14:
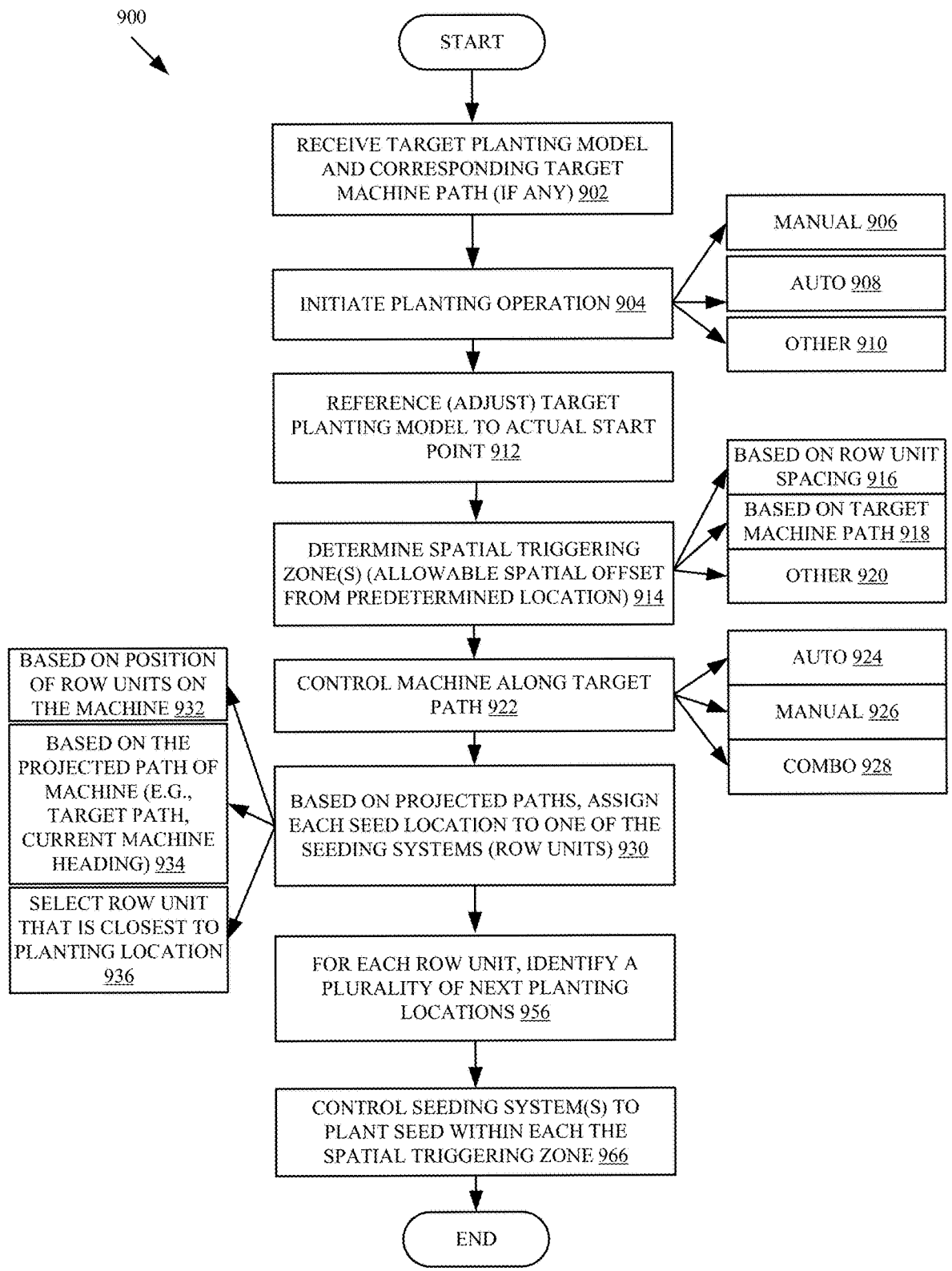
FIG. 14 is a flow diagram illustrating an example operation for planting control on an agricultural machine using a planting model.

FIG. 14 is a flow diagram 900 illustrating an example operation for planting control on an agricultural machine using a planting model. For sake of illustration, but not by limitation, FIG. 14 will be discussed in the context of machine 200 illustrated in FIG. 4 and control system 700 illustrated in FIG. 10.

At block 902, a target planting model 702 and/or a target machine path 703 can be received. The target planting model received at block 902 identifies a plurality of seed placement locations on a target field. Each location includes location information for the corresponding seed placement, such as global or local coordinates that can be used by the machine to place the seed at the corresponding location.

At block 904, the planting operation is initiated. This can be done manually at block 906 based on user input by the operator 258, automatically based on the machine detecting a location or mode of the machine at block 908, or otherwise. This is represented by block 910.

At block 912, based on the actual start point of the planting operation in the field, the target planting model can be referenced to that start point. In one example, this includes shifting or otherwise adjusting the seed placement locations based on the location of the first seed or set of seeds that are planted in the field.

At block 914, logic 724 determines the spatial triggering zones for triggering placement of each seed at the corresponding seed locations. As noted above, in one example the spatial triggering zones are determined based on the spacing between adjacent planting equipment. In the case of a planting machine with row units, this includes the row unit spacing between adjacent row units. This is represented by block 916. Alternatively, or in addition, the spatial triggering zones are determined based on the target machine path. This is represented by block 918. For example, based on the route machine 200 will traverse the field in following the target machine path, logic 724 can determine the required size for the spatial triggering zones such that at least one of the row units will traverse over the spatial triggering zones for each seed location. In one example, this includes setting the spatial triggering zone to be the largest distance between a seed planting location and the closest row unit. Of course, the spatial triggering zones can be determined in other ways as well. This is represented by block 920.

At block 922, the machine is controlled along the target path. This can be done in a number of ways. In one example, this is done automatically, represented by block 924. For example, as noted above, logic 728 can generate machine control signals 708 that control the propulsion system 712 and steering system 714 of machine 200 to drive machine 200 along the target path. In another example, the machine can be controlled manually by operator 258 to traverse the target path. This is represented by block 926. In one example, machine control signals 708 are generated to control a display device 710 to render an indication of the target path on a map display and/or suggested control inputs for operator 258 to control machine 200 to traverse the target path. Also, the machine 200 can be controlled based on a combination of automatic and manual control inputs. This is represented by block 928.

At block 930, seeding system control logic 726 assigns each seed location defined in the target planting model to one of the seeding systems 202 (e.g., a particular row unit in the example of FIG. 4). A particular row unit plants seeds at the seeding locations assigned to that row unit as the machine traverses along the path.

As illustrated in FIG. 14, this is based on the position of each seeding system (e.g., each row unit) on the machine. This is represented by block 932. Block 932, in one example, identifies the spatial location of each row unit across the machine for use in determining which row unit will plant seeds at each target planting location.

As also illustrated in FIG. 14, the seed location can be assigned to the seeding system based on the projected path of machine 200. This can include using the target machine path that will be used to control traversal of machine 200 over the field. Alternatively, or in addition, a current machine heading of machine 200 can be used to identify which row unit will be nearest to each planting location. This is represented by block 934. In any case, in the illustrated example the seed locations are assigned to the seeding system based on which seeding system (row unit) will be closest to the planting location as machine 200 traverses the field. This is represented by block 936.

Figure 15:
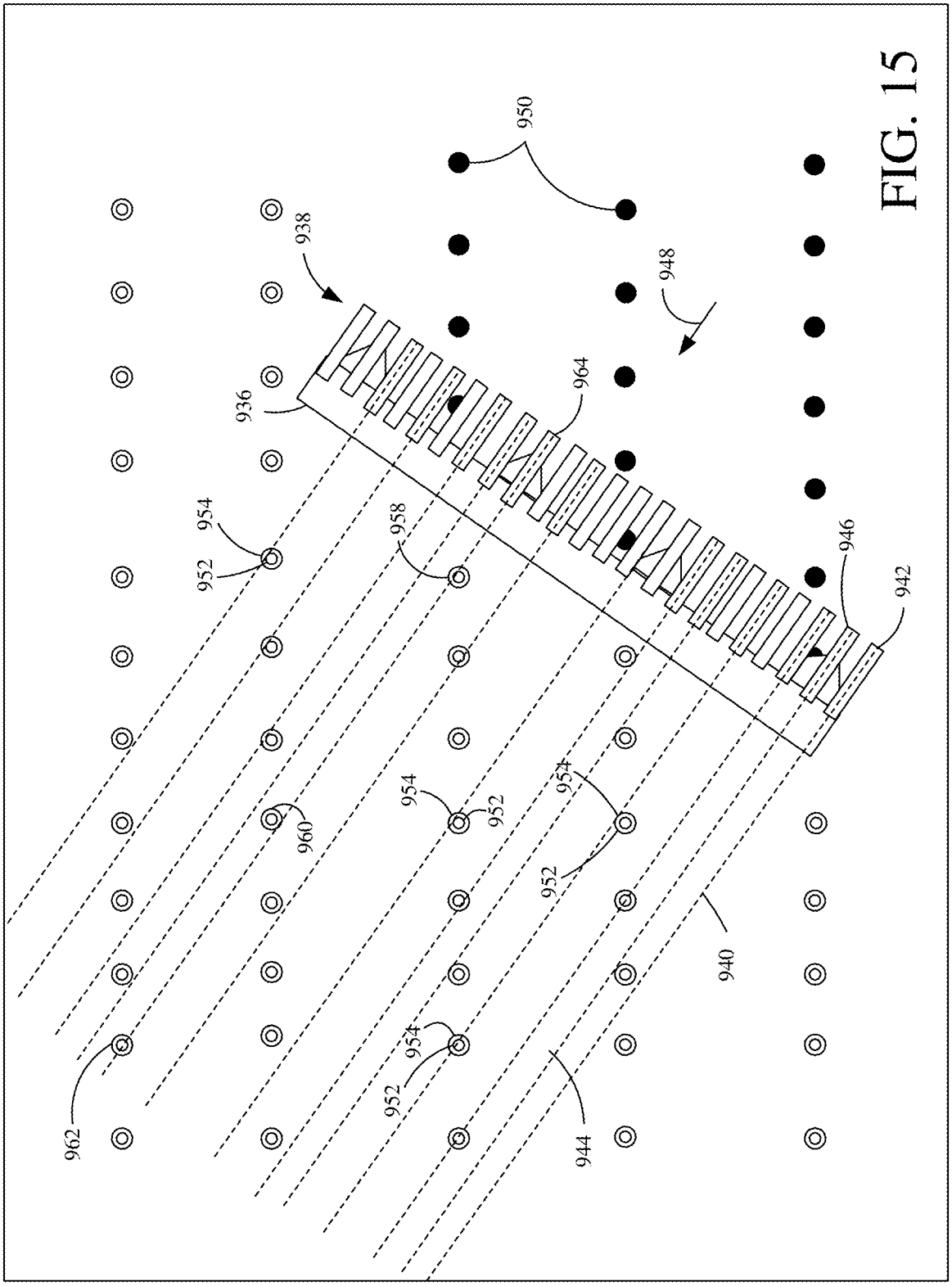
FIG. 15 is a schematic illustration of a plurality of row units mounted on an agricultural machine for an example planting operation.

For sake of further illustration, FIG. 15 is a schematic illustration showing a plurality of row units 938 mounted on a portion of a frame 936 of machine 200. In FIG. 15, the dashed lines illustrate the projected path of the corresponding row unit. For instance, dashed line 940 represents the projected path of row unit 942, dashed line 944 the projected path of row unit 946, etc. Arrow 948 represents the direction of movement of the machine and the solid dots 950 represent locations that have already been planted with seeds.

A plurality of seed planting locations 952 are identified using the target planting model. Each target location 952 has a corresponding spatial triggering zone 954. The spatial triggering zone 954 represents and area in which planting by the corresponding row unit will be triggered to place the seed corresponding to that planting location.

Referring again to FIG. 14, at block 956, seeding system control logic 726 identifies a plurality of next planting locations for each row unit. In the example of FIG. 15, logic 726 identifies that target planting locations 958, 960, and 962 are assigned to row unit 964, as row unit 964 is the row unit that will be closest to the planting location and will enter the spatial triggering zone of those planting locations.

In one example, logic 726 is configured to automatically prime metering system 204 based on the known field locations for placing the seeds. Illustratively, transport mechanism 216 is primed with a sequence of seeds, whose locations are stored and tracked in seed tracked queue 296. For each seed that is next in the sequence to be released, transport mechanism 216 is controlled to move that seed to a location just before its release from transport mechanism 216. Then, when the machine reaches the target location, only a relatively small movement of transport mechanism 216 is needed to release the seed, which can thus occur quickly with high precision. This can reduce seed waste (i.e., excess seeds that are released, but not properly planted, in the priming process).

Referring again to FIG. 14, at block 966, each seeding system 202 is controlled to plant each seed within the spatial triggering zone of the planting locations that are assigned to that seeding system.

In the example of FIG. 15, the seeding system 202 on row unit 964 is controlled by seed ejection system 242. Illustratively, this includes seed metering system 204 metering seed into seed transport mechanism 216. As discussed above, seed sensor 222 senses the location of the seeds in mechanism 216 and this information is stored in seed tracking queue 296. Using this tracking information, seed ejection control component 306 controls seed delivery system 206 so that row unit 964 places a first seed at seed location 958, a second seed at seed location 960, a third seed at location 962, and so on. In another example, seed metering system 204 is controlled to meter the seeds into a drop tube, or other similar mechanism, to place the seeds at the desired locations. In either case, after the seeds have been placed, the actual seed planting data 282 is stored to represent these seed placements.

It can thus be seen that the present seed delivery system provides a number of advantages. For example, but not by limitation, individual seeds are detected and tracked within the transport mechanism (e.g., brush belt). By tracking the seed individually, the transport mechanism can be controlled in a manner that facilitates precision location planting, without needing or relying on high precision metering to meter the seeds to the transport mechanism. Further, metering errors by a seed meter are not propagated to placement errors in the field. The seed detection, tracking, and control facilitates, among others, the execution of precise seed location strategies of seed in predetermined locations and/or spacings, seed skip compensation, seed drop point documentation (for use in other agricultural operations), synchronized seed drop points between rows, increased field utilization, obstacle avoidance, the creation of tram lines or complex seed patterns (e.g., corn maze).

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 16:
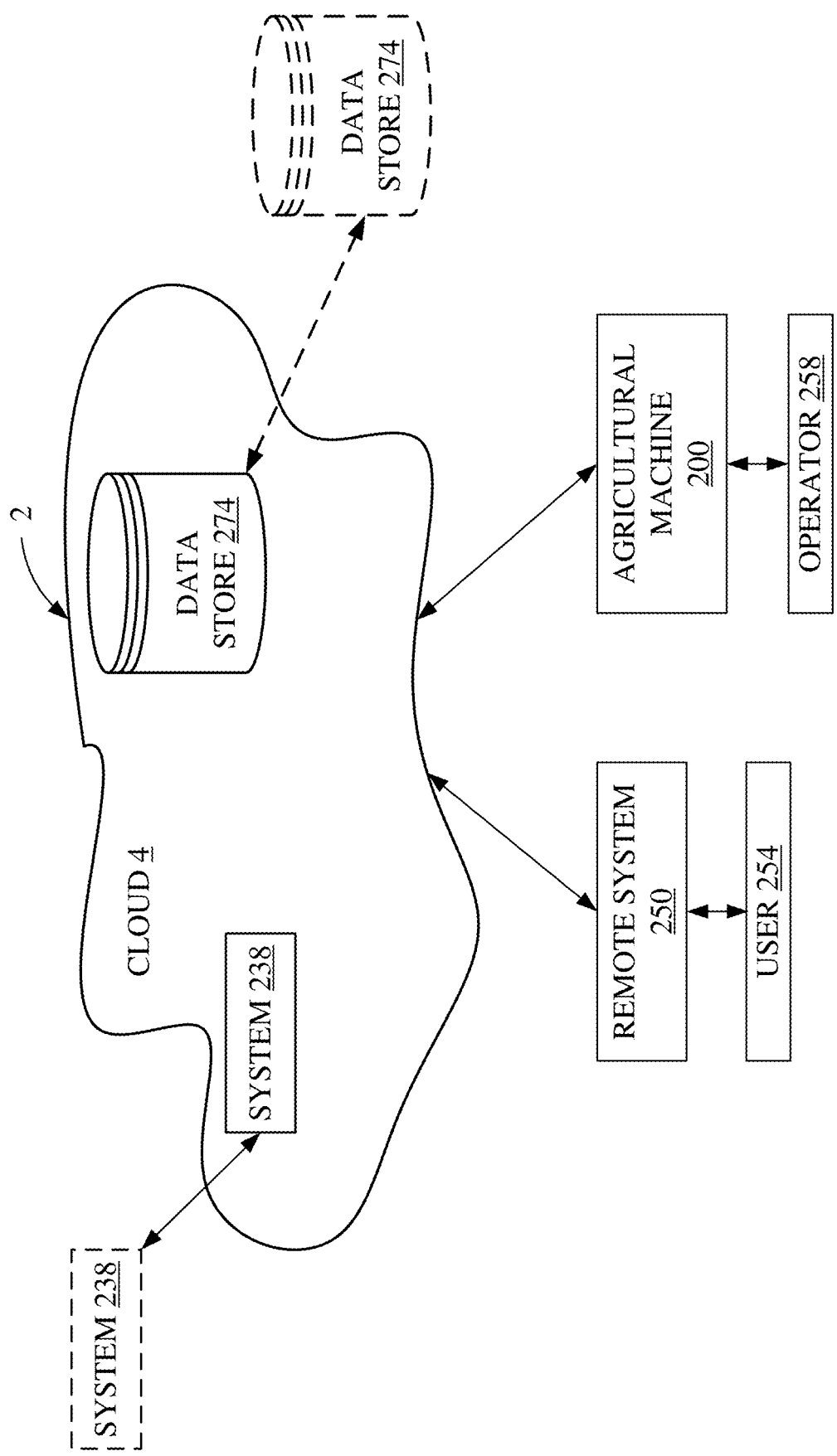
FIG. 16 is a block diagram showing one example of the architecture illustrated in FIG. 4, deployed in a remote server architecture.

FIG. 16 is a block diagram of one example of the agricultural machine architecture, shown in FIG. 4, where agricultural machine 200 communicates with elements in a remote server architecture 2. In an example, remote server architecture 2 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 4 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 16, some items are similar to those shown in FIG. 4 and they are similarly numbered. FIG. 16 specifically shows that system 238 and data store 274 can be located at a remote server location 4. Therefore, agricultural machine 200 accesses those systems through remote server location 4.

FIG. 16 also depicts another example of a remote server architecture. FIG. 16 shows that it is also contemplated that some elements of FIG. 4 are disposed at remote server location 4 while others are not. By way of example, data store 274 can be disposed at a location separate from location 4, and accessed through the remote server at location 4. Alternatively, or in addition, system 238 can be disposed at location(s) separate from location 4, and accessed through the remote server at location 4.

Regardless of where they are located, they can be accessed directly by agricultural machine 200, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural machine until the agricultural machine enters a covered location. The agricultural machine, itself, can then send and receive the information to/from the main network.

It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 17:
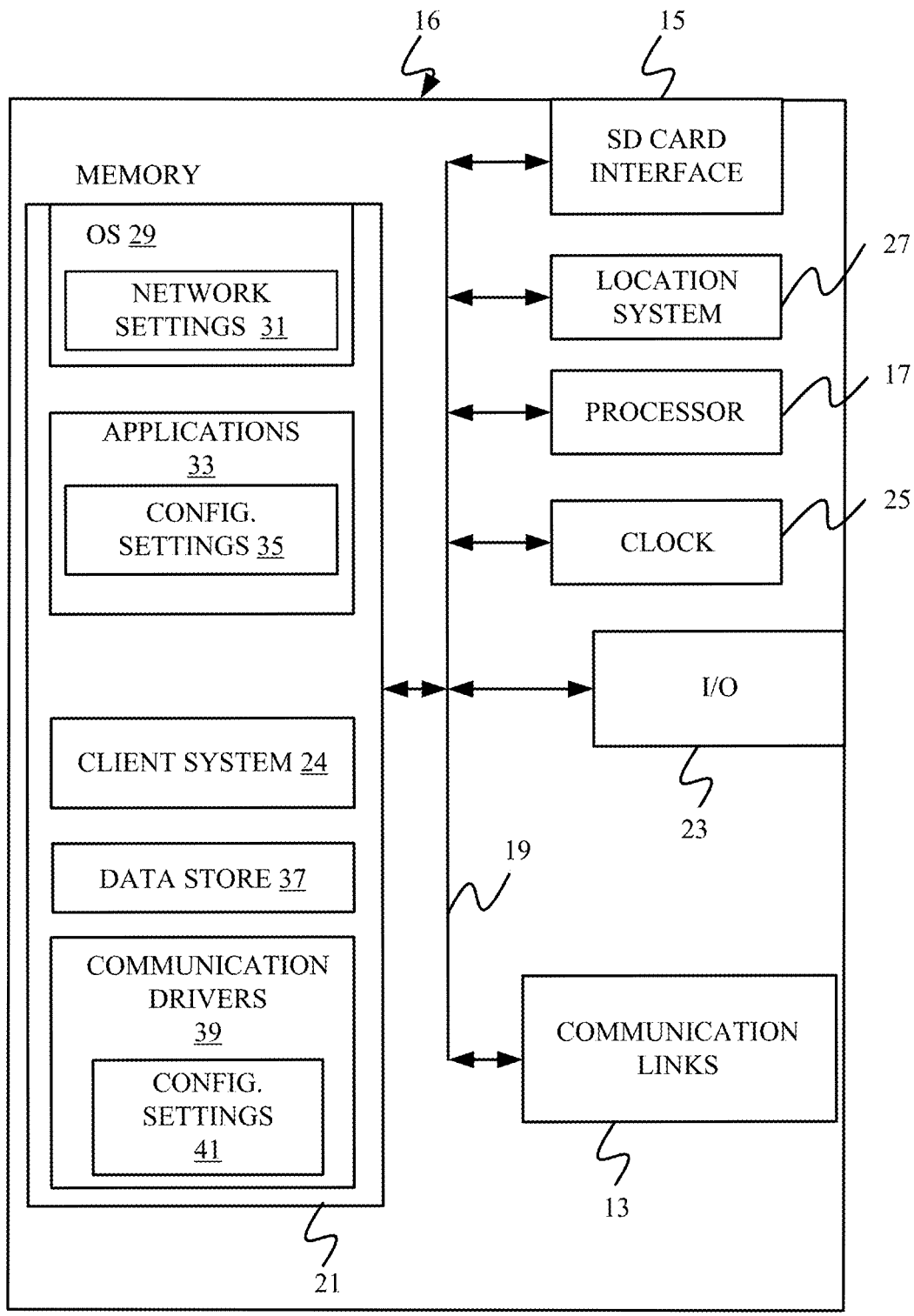
FIGS. 17-19 show examples of mobile devices that can be used in the architectures shown in the previous figures.
Figure 18:
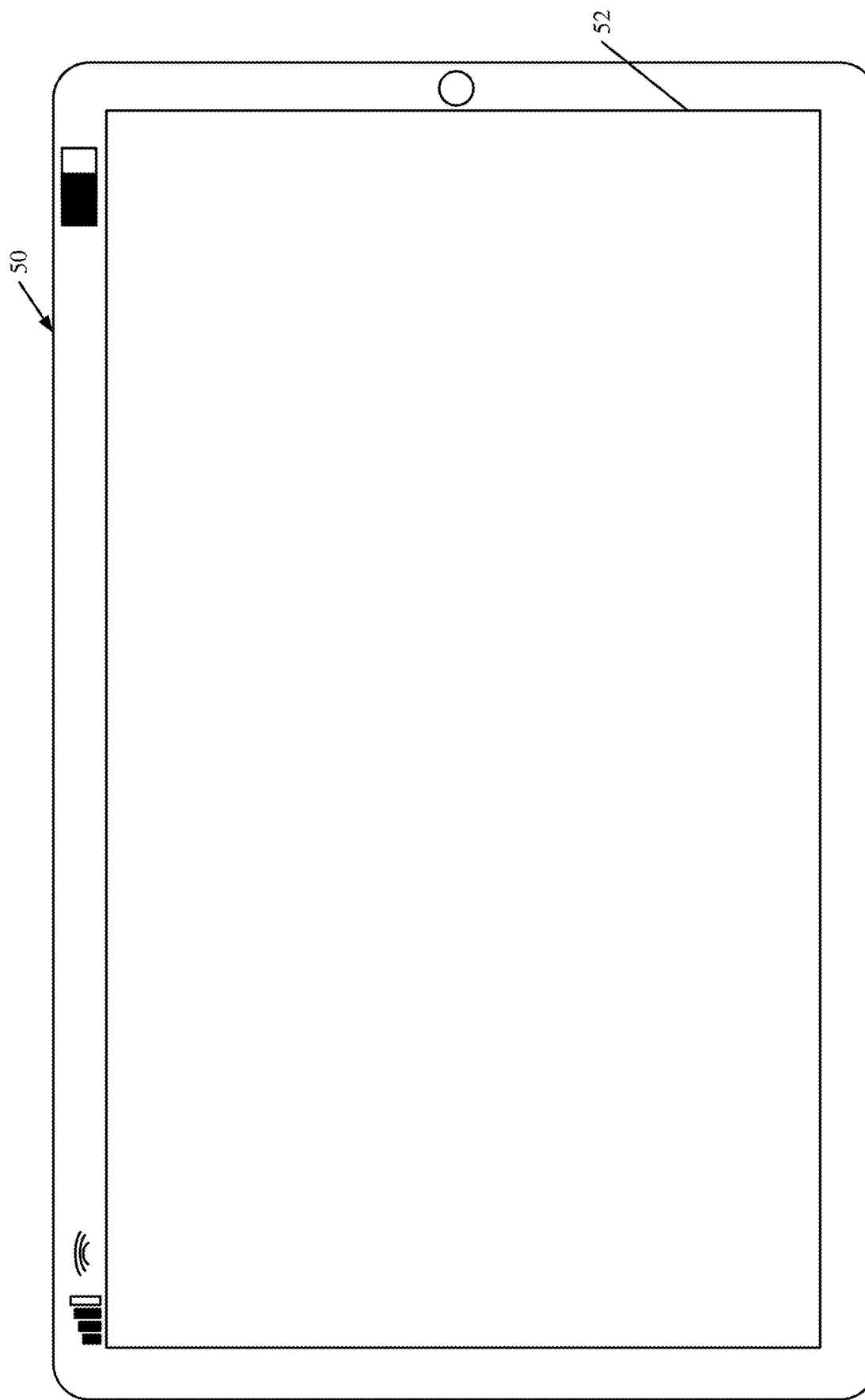
Figure 19:
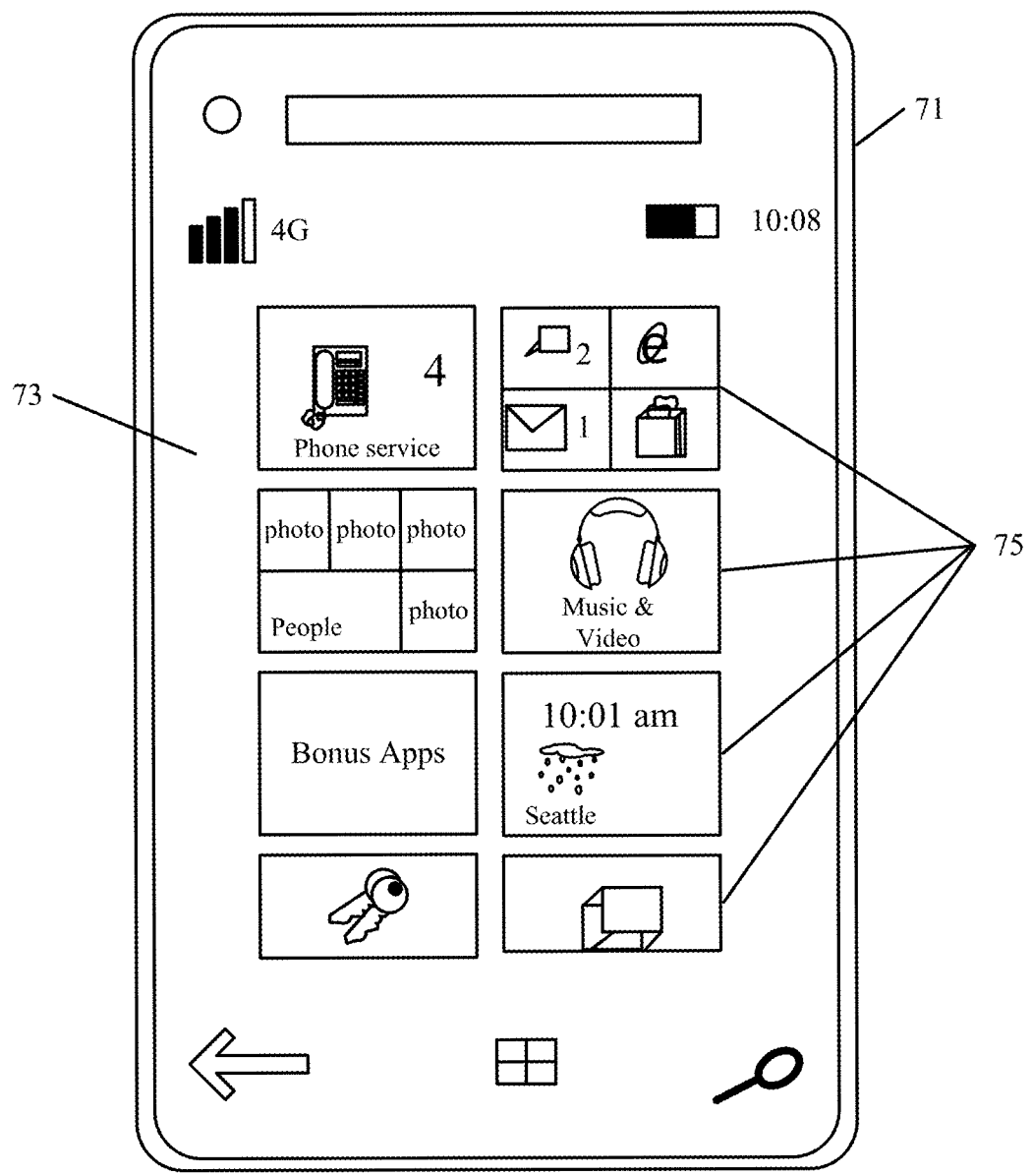

FIG. 17 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural machine 200 or as remote system 250. FIGS. 18-19 are examples of handheld or mobile devices.

FIG. 17 provides a general block diagram of the components of a client device 16 that can run some components shown in FIG. 4, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 18 shows one example in which device 16 is a tablet computer 50. In FIG. 18, computer 50 is shown with user interface display screen 52. Screen 52 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 50 can also illustratively receive voice inputs as well.

FIG. 19 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 20:
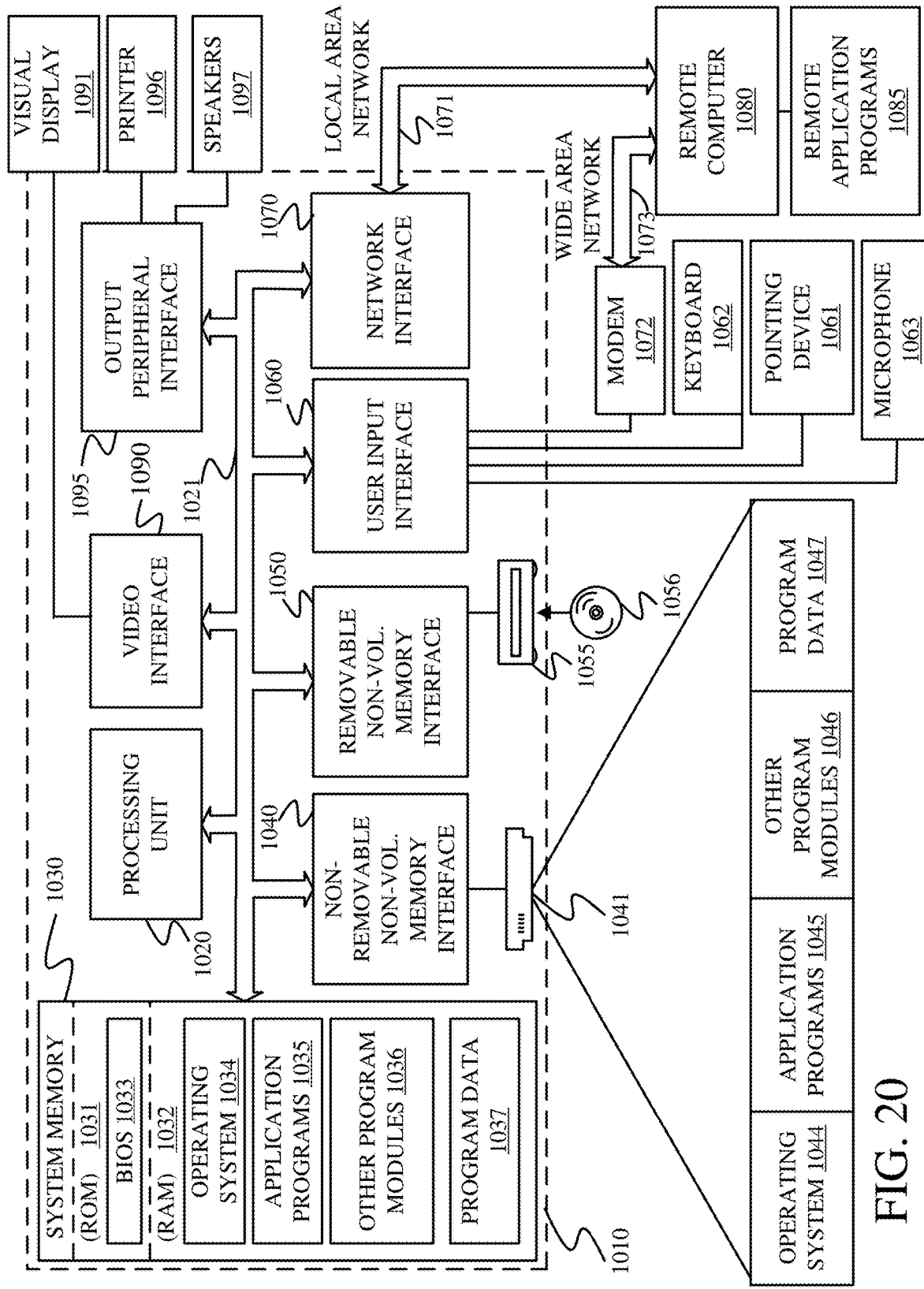
FIG. 20 is a block diagram showing one example of a computing environment that can be used in the architectures shown in the previous figures.

FIG. 20 is one example of a computing environment in which elements of FIG. 4, or parts of it, (for example) can be deployed. With reference to FIG. 20, an example system for implementing some embodiments includes a computing device in the form of a computer 1010. Components of computer 1010 may include, but are not limited to, a processing unit 1020 (which can comprise processors or servers from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to FIG. 4 can be deployed in corresponding portions of FIG. 20.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 20 illustrates operating system 1034, application programs 1035, other program modules 1036, and program data 1037.

The computer 1010 may also include other removable/non-removable volatile/nonvolatile computer storage media. By way of example only, FIG. 20 illustrates a hard disk drive 1041 that reads from or writes to non-removable, nonvolatile magnetic media, an optical disk drive 1055, and non-volatile optical disk 1056. The hard disk drive 1041 is typically connected to the system bus 1021 through a non-removable memory interface such as interface 1040, and optical disk drive 1055 is typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 20, provide storage of computer readable instructions, data structures, program modules and other data for the computer 1010. In FIG. 20, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a local area network—LAN, or wide area network—WAN or a controller area network—CAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 20 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Example 1 is an agricultural machine comprising:
 a seeding system comprising a plurality of planting units, each planting unit configured to meter and deliver seed; and
 a control system configured to:
  obtain a seed planting model that identifies a plurality of seed planting locations on a worksite;
  identify a machine path on the worksite;
  identify, based on the machine path, a set of the seed planting locations for each of the planting units; and
  control each planting unit to deliver seeds to the set of seed planting locations identified for the planting unit.

Example 2 is the agricultural machine of any or all previous examples, wherein the plurality of planting units comprises a plurality of row units.

Example 3 is the agricultural machine of any or all previous examples, wherein
 each row unit comprises:
  a seed transport mechanism configured to transport each seed along a transport route;
  a seed sensor configured to generate a sensor signal indicative of presence of each seed; and
  a motor configured to drive movement of the seed transport mechanism; and
 the control system is configured to:
  track a position of each seed along the transport route based on the sensor signal and detected movement of the seed transport mechanism; and
  generate a motor operating parameter based on the tracked position of the seed and a target parameter for releasing the seed at the seed planting location.

Example 4 is the agricultural machine of any or all previous examples, wherein the seed transport mechanism comprises a brush belt.

Example 5 is the agricultural machine of any or all previous examples, wherein the plurality of seed planting locations are arranged in a plurality of rows that are spaced apart on the worksite, and the control system is configured to control each planting unit to plant seeds in the plurality of rows as the agricultural machine traverses the worksite in a direction that is opposed to an orientation of the plurality of rows.

Example 6 is the agricultural machine of any or all previous examples, wherein the plurality of rows comprises parallel rows, and the control system is configured to control each planting unit to plant seeds in the plurality of rows as the agricultural machine traverses the worksite in a direction that is nonparallel to the plurality of rows.

Example 7 is the agricultural machine of any or all previous examples, wherein the control system is configured to:
 detect a start point on the worksite that corresponds to a planting location of a first one of the seeds; and
 adjust a relative position of the seed planting model to the worksite based on the detected start point.

Example 8 is the agricultural machine of any or all previous examples, wherein the control system comprises:
 machine path generation logic configured to:
  generate a plurality of potential machine paths; and
  select the machine path from the plurality of potential machine paths.

Example 9 is the agricultural machine of any or all previous examples, wherein the machine path generation logic comprises planting error determination logic configured to:
 for each potential machine path,
  identify planting position errors based on the plurality of seed planting locations relative to the potential machine path, and
  generate an aggregate planting error metric indicative of an aggregation of the planting position errors; and
 select the machine path based on the aggregate planting error metrics for the plurality of potential machine paths.

Example 10 is the agricultural machine of any or all previous examples, wherein the machine path is selected based on a projected effect of the potential machine paths on a target performance metric for the agricultural machine.

Example 11 is the agricultural machine of any or all previous examples, wherein the control system comprises:
 spatial triggering zone determination logic configured to determine a spatial triggering zone for the seed planting locations.

Example 12 is the agricultural machine of any or all previous examples, wherein the spatial triggering zone is based on a spacing between the planting units.

Example 13 is the agricultural machine of any or all previous examples, wherein the control system is configured to:
 generate a control signal to control the machine based on the machine path.

Example 14 is a method performed by an agricultural machine having a plurality of planting units, the method comprising:
 obtaining a seed planting model that identifies a plurality of seed planting locations on a worksite;
 identifying a machine path on the worksite;

identifying, based on the machine path, a set of the seed planting locations for each of the planting units; and
controlling each planting unit to deliver seeds to the set of seed planting locations identified for the planting unit.

Example 15 is the method of any or all previous examples, wherein the plurality of planting units comprises a plurality of row units, each row unit comprises:
a seed transport mechanism configured to transport each seed along a transport route;
a seed sensor configured to generate a sensor signal indicative of presence of each seed along the transport route; and
a motor configured to drive movement of the seed transport mechanism; and
the method further comprising:
tracking a position of each seed along the transport route based on the sensor signal and detected movement of the seed transport mechanism; and
generating a motor operating parameter based on the tracked position of the seed and a target parameter for releasing the seed at the seed planting location.

Example 16 is the method of any or all previous examples, wherein the plurality of seed planting locations are arranged in a plurality of rows that are spaced apart on the worksite, the method further comprising:
controlling each planting unit to plant seeds in the plurality of rows as the agricultural machine traverses the worksite in a direction that is opposed to an orientation of the plurality of rows.

Example 17 is the method of any or all previous examples, wherein the plurality of rows comprises parallel rows, and the method comprising:
controlling each planting unit to plant seeds in the plurality of rows as the agricultural machine traverses the worksite in a direction that is nonparallel to the plurality of rows.

Example 18 is an agricultural machine comprising:
a seeding system comprising a plurality of row units, each row unit comprises:
a seed transport mechanism configured to transport each seed along a transport route;
a seed sensor configured to generate a sensor signal indicative of presence of each seed along the transport route; and
a motor configured to drive movement of the seed transport mechanism to transport each seed; and
a control system configured to:
obtain a seed planting model that identifies a plurality of seed planting locations on a worksite;
identify a machine path on the worksite;
identify, based on the machine path, a set of the seed planting locations for each of the planting units;
track a position of each seed along the transport route based on the sensor signal and detected movement of the seed transport mechanism; and
generate a motor operating parameter based on the tracked position of the seed and a target parameter for releasing the seed at the seed planting location.

Example 19 is the agricultural machine of any or all previous examples, wherein the plurality of seed planting locations are arranged in a plurality of rows that are spaced apart on the worksite, and the control system is configured to control each planting unit to plant seeds in the plurality of rows as the agricultural machine traverses the worksite in a direction that is opposed to the plurality of rows.

Example 20 is the agricultural machine of any or all previous examples, wherein the plurality of rows comprises parallel rows, and the control system is configured to control each planting unit to plant seeds in the plurality of rows as the agricultural machine traverses the worksite in a direction that is nonparallel to the plurality of rows.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine comprising:
a seeding system comprising first and second planting units, each planting unit configured to meter and deliver seed; and
a control system configured to:
obtain a target seed planting model that defines a plurality of seed planting locations for planting seeds on a worksite;
identify a machine path on the worksite;
based on the machine path, identify a first set of the seed planting locations for the first planting unit and a second set of the seed planting locations for the second planting unit; and
control operation of the first planting unit to deliver seeds to the first set of seed planting locations and operation of the second planting unit to deliver seeds to the second set of seed planting locations.

2. The agricultural machine of claim 1, wherein
the first and second planting units comprises first and second row units, and
each seed planting location, of the plurality of seed planting locations, includes a corresponding, geographic coordinate that defines the seed planting location relative to the worksite.

3. The agricultural machine of claim 2, wherein
each of the first and second row units comprises:
a seed transport mechanism configured to transport each seed along a transport route;
a seed sensor configured to generate a sensor signal indicative of presence of each seed; and
a motor configured to drive movement of the seed transport mechanism; and
the control system is configured to:
track a position of each seed along the transport route based on the sensor signal and detected movement of the seed transport mechanism; and
generate a motor operating parameter based on the tracked position of the seed and a target parameter for releasing the seed at the seed planting location.

4. The agricultural machine of claim 3, wherein the seed transport mechanism comprises a brush belt.

5. The agricultural machine of claim I , wherein the plurality of seed planting locations are arranged in a plurality of rows that are spaced apart on the worksite, and the control system is configured to control each of the first and second planting units to plant seeds in the plurality of rows as the agricultural machine traverses the worksite in a direction that is opposed to an orientation of the plurality of rows.

6. The agricultural machine of claim 5, wherein the plurality of rows comprises parallel rows, and the control system is configured to control each of the first and second planting units to plant seeds in the plurality of rows as the agricultural machine traverses the worksite in a direction that is nonparallel to the plurality of rows.

7. The agricultural machine of claim 1, wherein the control system is configured to:
  detect a start point on the worksite that corresponds to a planting location of a first one of the seeds; and
  adjust a relative position of the target seed planting model to the worksite based on the detected start point.

8. The agricultural machine of claim 1, wherein the control system comprises:
  machine path generation logic configured to:
    generate a plurality of potential machine paths; and
    select the machine path from the plurality of potential machine paths.

9. The agricultural machine of claim 8, wherein the machine path generation logic comprises planting error determination logic configured to:
  for each potential machine path,
    identify planting position errors based on the plurality of seed planting locations relative to the potential machine path, and
    generate an aggregate planting error metric indicative of an aggregation of the planting position errors; and
  select the machine path based on the aggregate planting error metrics for the plurality of potential machine paths.

10. The agricultural machine of claim 9, wherein the machine path is selected based on a projected effect of the potential machine paths on a target performance metric for the agricultural machine.

11. The agricultural machine of claim 1, wherein the control system comprises:
  spatial triggering zone determination logic configured to determine a spatial triggering zone for the seed planting locations.

12. The agricultural machine of claim 11, wherein the spatial triggering zone is based on a spacing between the first and second planting units.

13. The agricultural machine of claim 1, wherein the target seed planting model comprises a predefined target planting map that is defined prior to operation of the agricultural machine to plant the seeds in the first and second sets of seed planting locations.

14. A method performed by an agricultural machine having at least a first planting unit and a second planting unit, the method comprising:
  obtaining a target seed planting model that defines a plurality of seed planting locations for planting seeds on a worksite;
  identifying a machine path on the worksite;
  based on the machine path, identifying a first set of the seed planting locations for the first planting unit and a second set of the seed planting locations for the second planting unit;
  controlling the first planting unit to deliver seeds to the first set of seed planting locations; and
  controlling the second planting unit to deliver seeds to the second set of seed planting locations.

15. The method of claim 14, wherein the first and second planting units comprise first and second row units, each row unit comprises:
  a seed transport mechanism configured to transport each seed along a transport route;
  a seed sensor configured to generate a sensor signal indicative of presence of each seed along the transport route; and
  a motor configured to drive movement of the seed transport mechanism; and
  the method further comprising:
    tracking a position of each seed along the transport route based on the sensor signal and detected movement of the seed transport mechanism; and
    generating a motor operating parameter based on the tracked position of the seed and a target parameter for releasing the seed at the seed planting location.

16. The method of claim 14, wherein the plurality of seed planting locations are arranged in a plurality of rows that are spaced apart on the worksite, the method further comprising:
  controlling each of the first and second planting units to plant seeds in the plurality of rows as the agricultural machine traverses the worksite in a direction that is opposed to an orientation of the plurality of rows.

17. The method of claim 16, wherein the plurality of rows comprises parallel rows, and the method comprising:
  controlling each of the first and second planting units to plant seeds in the plurality of rows as the agricultural machine traverses the worksite in a direction that is nonparallel to the plurality of rows.

18. An agricultural machine comprising:
a seeding system comprising a plurality of row units, each row unit comprises:
  a seed transport mechanism configured to transport each seed along a transport route;
  a seed sensor configured to generate a sensor signal indicative of presence of each seed along the transport route; and
  a motor configured to drive movement of the seed transport mechanism to transport each seed; and
controla system configured to:
  obtain a seed planting model that identities a plurality of seed planting locations on a worksite;
  identify a machine path on the worksite;
  identify, based on the machine path, a set of the seed planting locations for each of the planting units;
  track a position of each seed along the transport route based on the sensor signal and detected movement of the seed transport mechanism; and
  generate a motor operating parameter based on the tracked position of the seed and a target parameter for releasing the seed at the seed planting location.

19. The agricultural machine of claim 18, wherein the plurality of seed planting locations are arranged in a plurality of rows that are spaced apart on the worksite, and the control system is configured to control each planting unit to plant seeds in the plurality of rows as the agricultural machine traverses the worksite in a direction that is opposed to the plurality of rows.

20. The agricultural machine of claim 19, wherein the plurality of rows comprises parallel rows, and the control system is configured to control each planting unit to plant seeds in the plurality of rows as the agricultural machine traverses the worksite in a direction that is nonparallel to the plurality of rows.

* * * * *